US012728966B2

(12) United States Patent
Melen et al.

(10) Patent No.: US 12,728,966 B2
(45) Date of Patent: Sep. 8, 2026

(54) INSTALLATION FOR THE LOAD-OUT INTO THE WATER OF A HEAVY LOAD

(71) Applicants: SOLETANCHE FREYSSINET, Rueil-Malmaison (FR); ROLL HOLDING B.V, Capelle aan den Ijssel (NL)

(72) Inventors: Benoit Melen, Rueil Malmaison (FR); Roel Wesel, Capelle aan den Ijssel (NL)

(73) Assignee: SOLETANCHE FREYSSINET, Rueil-Malmaison (FR)

( * ) Notice: Subject to any disclaimer, the term of this patent is extended or adjusted under 35 U.S.C. 154(b) by 4 days.

(21) Appl. No.: 18/710,611

(22) PCT Filed: Nov. 10, 2022

(86) PCT No.: PCT/EP2022/081531

§ 371 (c)(1),
(2) Date: May 15, 2024

(87) PCT Pub. No.: WO2023/088788

PCT Pub. Date: May 25, 2023

(65) Prior Publication Data

US 2025/0010961 A1 Jan. 9, 2025

(30) Foreign Application Priority Data

Nov. 17, 2021 (FR) ....................................... 2112150

(51) Int. Cl.
*B63B 75/00* (2020.01)
*B63B 73/30* (2020.01)
*F03D 13/25* (2016.01)

(52) U.S. Cl.
CPC .............. *B63B 75/00* (2020.01); *B63B 73/30* (2020.01); *F03D 13/256* (2023.08); *F05B 2240/93* (2013.01)

(58) Field of Classification Search
CPC ......... B63B 75/10; B63B 77/00; B63B 77/10; B63B 73/30; F03D 13/256; F03D 2240/93
See application file for complete search history.

(56) References Cited

U.S. PATENT DOCUMENTS

2011/0126747 A1* 6/2011 Wu ......................... B63B 25/28 114/124
2011/0129329 A1* 6/2011 Wu ......................... F03D 13/25 415/7
2018/0030963 A1 2/2018 Viselli et al.

FOREIGN PATENT DOCUMENTS

CN 103 693 170 4/2014
EP 2789847 10/2014

(Continued)

OTHER PUBLICATIONS

AMW Marine: "4x HamiltonJet HT900 Successfully delivered by AMW-MARINE, for the Damen Crew Supply Vessel FCS 7011"—https://amw.nl/en/hamiltonjet-fcs7011/ (Year: 2023).*

(Continued)

*Primary Examiner* — Kyle Armstrong
(74) *Attorney, Agent, or Firm* — IPSILON USA, LLP

(57) ABSTRACT

An installation for the load-out into the water of a heavy load located onshore, in particular a load constituted by a tripod- or tetrapod-type float.

The installation has at least two support structures that are independent of one another and can be moved on the respective paths, each of which being equipped with lifting means configured to be hooked to the load, each of these support structures being equipped with a counterweight.

The installation is configured to allow the lifting means of the support structures, when the load is positioned in the (Continued)

load-out area, to extend at least partially above the water in order to lower the load into it.

28 Claims, 24 Drawing Sheets

(56) References Cited

FOREIGN PATENT DOCUMENTS

| | | | | | |
|---|---|---|---|---|---|
| KR | 101164893 | B1 * | 7/2012 | ............. | E02B 17/00 |
| KR | 101169722 | B1 * | 7/2015 | ............. | E02B 17/00 |
| TW | 201 130 713 | | 9/2011 | | |
| WO | WO-2024184625 | A1 * | 9/2024 | ............. | B63B 75/00 |

OTHER PUBLICATIONS

Anonymous: "4x HamiltonJet HT900 Successfully delivered by AMW-MARINE, for the Damen Crew Supply Vessel FCS 7011 -AMW—Marine", Jun. 15, 2021 (Jun. 15, 2021), XP093019045, Retrieved from the Internet.

Anonymous: "Transverse load-out supports floating wind farm I Wind SystemsMagazine", May 13, 2021 (May 13, 2021), XP093019107, Retrieved from the Internet: URL:https://web.archive.org/web/20210513082731/https://www.windsystemsmag.com/transverse-load-out-supports-floating-wind-farm/.

International Search Report dated Jan. 31, 2023.

* cited by examiner 20
10

32

INSTALLATION FOR THE LOAD-OUT INTO THE WATER OF A HEAVY LOAD

RELATED APPLICATION

This application is a National Phase of PCT/EP2022/081531 filed on Nov. 10, 2022, which claims the benefit of priority from French Patent Application No. 21 12150 filed on Nov. 17, 2021, the entirety of which are incorporated by reference.

TECHNICAL FIELD

The present invention relates to the load-out into the water of a heavy load, and more specifically, but not exclusively, that of a heavy load constituted by a float for an offshore wind turbine.

PRIOR ART

The development of offshore wind turbines is accompanied by an increase in the power and size thereof.

It is presently commonplace to install floating wind turbines at sea, said wind turbines having a tower borne by a float that can be wholly or partially submerged.

Wind turbines having tripod or tetrapod floats, with the tower resting on one of the feet of the float or in the center, have thus been developed.

Such floats may be made from metal or concrete and have significant weight and bulk, for example 4000 t or more.

They are generally manufactured on land and loaded out into the water using harbor installations adapted to transport them and load them out into the water. These adapted harbor installations, which have handling means for heavy loads, can be located far away from the wind farm, thereby making transport to the site lengthy and expensive.

It is possible that the harbor installations closest to the wind farm cannot be adapted, because they are too small, lack adequate handling means, or require considerable infrastructure work that is not necessarily profitable if said harbor installations are used only once for the installation of the farm for the completed wind turbine.

CN 103693170 discloses an offshore platform for the assembling of wind turbine structures. The platform is relatively large and the assembling of the structure offshore raises some difficulties as there is limited space available on the platform and is less convenient than onshore.

DISCLOSURE OF THE INVENTION

Consequently, there is a need to benefit from a system facilitating the load-out into the water of heavy loads such as structures having a non-negligible height, and avoiding the use of heavy harbor installations.

SUMMARY OF THE INVENTION

The invention achieves this objective by proposing an installation for the load-out into the water of a heavy load located onshore, in particular a load constituted by a tripod- or tetrapod-type float, having:

at least two support structures that are independent of one another and that may be moved on respective paths, each of which being equipped with lifting means configured to be hooked to the load, each of these support structures being equipped with a counterweight, the installation being configured to allow the lifting means of the support structures, when the load is positioned in a load-out area, to extend at least partially above the water in order to lower the load into it.

A "float" is understood to mean a structure that floats at least temporarily, while it is being transported to the site for example. Such a structure is sometimes also referred to as "jacket".

A "heavy load" is understood to mean a load with a weight typically greater than or equal to 1000 t, better still 3000 t, or even 4000 t, while still being less than 15000 t or more, for example 50 000 t.

The lifting means may be present at one end of the support structure and the counterweight at the opposite end.

The invention enables load-out into the water that is less dependent on the sea and wind conditions; then, it makes it possible to limit the amount of civil engineering work for reinforcing the harbor structures for a number of limited elements to be loaded out into the water. The invention thus makes it possible to solve the particular problem of expensive investments in harbor civil engineering work for transferring wind turbine floats from the construction/assembly dock to their load-out area.

The invention also makes it possible to limit the number of maintenance operations for the marine site, such as dredging at the load-out location, since few items of equipment move underwater (except in the submersible-barge variant described in detail below).

The invention makes it possible to avoid the use of large-capacity handling means, which would have a higher carbon footprint.

The installation may comprise movement paths extending from an onshore area for receiving the load to an area for loading out said load.

The installation may have at least three support structures each of which is equipped with lifting means and a counterweight, with possible movement paths being arranged such that, in the load-out area, all the lifting means of the support structures are located at least partially above the water in order to lower the load into it.

At least one support structure, and preferably all support structures, may comprise at least a first blocking element configured to interfere with at least a second blocking element carried by the load to limit lateral displacement of the load relative to the support structure once the load has been lifted to a top position by the lifting means; the at least one first blocking element preferably comprises two opposite guides between which the at least one second blocking element can engage. The at least one second blocking element can comprise a cage disposed on the load over lugs serving to attach the lifting cables to the load. Such a cage comprises openings for the passage of the cables and sides walls that may contact the guides once the load has reached its top position. In this manner, the load is prevented from moving laterally relative to the support structures during its displacement on ground or under the effect of the wind for example. However, the cooperation between the first and second elements may authorize a small move due to differences in height of the points where the load is connected to the lifting means, this small move being caused for example by a small variation of the sea level or barge (in variants a barge is used).

It is possible for the installation to have, or not to have, a barge for carrying part of the load and assisting in the entire process of transporting it to the load-out area, it being possible for this barge to have or not to have a support structure similar to those that move on land to bring the load as far as the load-out area.

The presence of a barge can make it possible to reduce the civil engineering works that are to be provided over the solution without a barge. The support structures and/or the barge can be easily transported from one industrial harbor site to another. The invention thus makes it possible to have a heavy lifting system with lifting structures that can be brought into and out of use, and transferred by boat.

In exemplary embodiments of the invention, the installation thus has at least one barge. This barge may be movable so as to accompany the movement of the load toward its load-out position. The barge may be connected to the support structures located onshore and/or the dock by mooring lines; these mooring lines may be arranged so as to be gradually unspooled as the load moves away from the dock. Some deviation saddles may be provided on the dock edge to protect the lines from bearing directly on the dock edge.

The installation may have at least one offshore support structure borne by the barge, provided at one end with a lifting means configured to be hooked to the load. The load may thus be connected to the lifting means of the various support structures at least three points, two of them being carried by onshore support structures and one by an offshore support structure.

The barge may have an adjustable ballast or a counterweight system making it possible to keep the support structure located above horizontal, in particular during the partial transfer of the load onto the barge and/or the lowering of the load.

The barge may have compartments in which water is pumped in or out in order to keep the barge substantially horizontal during lifting of the load up or down into the water. During operation of the barge, water may be pumped out one compartment, for example adjacent the load, and pumped in a different compartment, for example opposite the load.

The installation may comprise at least one inclinometer carried by the load and the lifting means may be controlled so as to maintain the load horizontal during lifting based on the signal delivered by the at least one inclinometer. The control of the lifting means may also be based on signals delivered by effort sensors present on the lifting means.

The installation may comprise at least one inclinometer carried by the barge and the ballast pumps may be controlled based on the signal delivered by this at least one inclinometer to maintain the barge horizontal during the lifting operations.

Preferably, the lifting means are controlled together with the ballast pumps to maintain both the load and the barge horizontal during the lifting operations, from the initial lift until the immersion of the load into the water.

The control of the horizontality of the load and/or the barge may be automatic, with a possibility of manual override, for safety reasons.

The lifting means of the support structure carried by the barge have a cable length long enough to accommodate variations of the sea level due to tides. In this way, the load can be lifted and kept at a distance from the ground at low or hide tide. The level variation due to tide may be about 2 m/h for example, while the cables of the lifting means can be raised at a speed of about 15 m/h for example.

As detailed above, the lateral movements of the load relative to the support structures may be blocked with interfering elements once the load has reached its top position after lifting; however, the interfering elements may be configured to allow small vertical movements due to the tide in case the load is connected at one point to a support structure carried by a barge and at other points to support structures located onshore.

The barge may comprise a support structure having a base of a dimension selected to increase the height of the lifting means to compensate for the difference of height between the sea level and the ground. Such base may extend substantially all along the width of the barge. The lifting means may be of a length greater than the length of the base. The base may have a lattice structure.

As a variant, the barge may be submersible, being positioned in the continuation of one of the movement paths of the load on the dock, and have an extension to this path making it possible to move the load onto the barge. In this case, the barge is moved in the water until the load has fully reached the load-out area, and then the barge is gradually submerged to accompany the lowering of the load by the lifting means of the support structures located onshore. When it is submersible, the barge is preferably oriented with its longitudinal axis parallel to the dock. It is preferably provided with stability towers at the four corners.

The support structures may be oriented parallel to the movement paths. Such a solution is very particularly appropriate when the installation has a barge.

As a variant, the support structures are oriented transversely with respect to the movement paths. Such a solution is very particularly suitable for an installation without a barge, the dock having for example two platforms or other structure on piles along which extend the movement paths, the load-out area extending between these platforms or other structure.

The support structures can then be movable along their longitudinal axis relative to the movement paths, so as to enable them to be moved away from the load once it has been loaded out into the water. This facilitates the departure of the load by floating it to a storage area or its final destination.

Generally, the support structures extend preferably horizontally overall, having for example latticework girders. The latticework girders may have horizontal beams connected together by oblique connecting elements. These connecting elements may extend in vertical planes, between two vertically superposed beams. The beams may be joined together by upper and lower crossmembers.

The movement paths may have rails and/or movement means of SPMT (Self-Propelled Modular Transporter) type; the rails may act as guides for a movement system of APS (Air Pad Sliding) type, which is a sliding support system provided with shoes on air cushions making it possible to reduce the sliding friction coefficient, for example to 1% of the vertical load, and for example as described in the patent EP 1 854 746.

The installation preferably comprises at least two, preferably three, movement paths.

The movement paths may be all parallel to each other, or in a variant have different directions or be parallel for part thereof and have different directions for other parts.

In some embodiments, the movement paths are all defined by rails or at least partially defined by rails.

In some other embodiments, at least some part of the movement paths or some movement paths are not defined by rails, and are for example defined by concrete surfaces or by tracks or routes on which wheel transporters such as SPMTs can run.

In one embodiment, the installation comprises three movement paths that extend generally parallel to each other and that may be defined by rails. These movement paths may extend to an end of the dock next to the water. The load may be a tripod having feet each carried by a transporter running on a corresponding movement path, before connection of the load with the lifting means of the support structures. One of them may be carried by a barge, and the other two may be connected to the load once the latter has advanced past a predefined area. The installation may comprise additional movement paths enabling each of the two support structures to move from a first place where it is distant from a movement path on which the load runs (and thus allows the load to move along the movement path(s) without being hindered by the support structure resting in the first place) to a second place where it lies on this movement path behind the load, i.e. opposite to the barge with respect to the load (and may accompany the load in its travel in the direction of the water). The additional movement paths may be defined by rails, that are perpendicular to the rails of the movement paths on which the load runs.

In another embodiment, the installation comprises two movement paths along which the load is displaced. These two paths may comprise rails. The load may be a tripod having two feet that run along a same movement path and an opposite foot that runs on the other movement path. The installation may comprise two additional movement paths on which the support structures run. These additional movement paths may be external to the movement paths on which the load runs. The additional movement paths may extend parallel to the movement paths on which the load runs. The additional movement paths may be defined by rails on which the support structures run. The orientation of the support structures may be transverse to these movement paths. There may be two support structures running on one additional movement path and one on the other additional movement path. The installation may comprise two piers on which the additional movement paths extend. In such embodiment, there is no barge, and the load is hoisted down to the water between the piers by one support structure lying on one pier and the two others on the other pier. For a quadripod type load, there would be two support structures on each pier.

In another embodiment, the installation comprises two movement paths that may run parallel to each other, generally perpendicular to the dock, and at least one extra movement path that may run generally perpendicularly to the other two. The first two movement paths may each be equipped with rails. The at least one extra path may be a concrete surface on which wheel transporters such as SPMT can run, from a first place where the assembling of the load has been completed for example, to a second place where the load can be hoisted by the support structures for the load out into the water. In such embodiment, a barge carrying a third support structure may be used. When the load has reached the second place, the load may rest on the wheel transporters such as the SPMTs until it is hoisted up by the lifting means of the support structures. Once hoisted up by the lifting means, the wheel transporters such as the SPMTs may be returned to the first place before the support structures are moved to load out the load into the water.

In another embodiment, the installation comprises wheel transporters such as SPMTs for carrying onshore two feet of the load while another foot is carried by a support structure present on a barge; the onshore support structures comprise rotatable lifting means such as cranes and the load out is performed by rotating the two lifting means while moving the barge away from the dock. Each crane may both rotate and translate in a longitudinal direction of the crane during transportation of the load from onshore to offshore. Each support structure carrying a crane may have a static mast located near an edge of the dock, that supports the crane while allowing the necessary movements of the crane relative to the mast.

The support structures may be equipped with a PPU ("Push Pull Unit"), which enables them to move along slide rails, in particular in the case of movement means of APS type or other sliding-shoe means.

The support structures may be arranged to raise the load while it is being transported to the load-out area.

The movement paths may be equipped with support pads on which the load rests during the static phases.

The support structures may have shoes made from synthetic material (or any other support devices made of elastomer material) that can bear against the load, in particular before it is loaded out into the water.

The lifting means may have cable jacks or any other lifting equipment, for example having a winch.

Another object of the invention, according to another of its aspects, is a method for the load out into the water of a heavy load, in particular a tripod- or tetrapod-type float, using an installation according to the invention as defined above, in which:

- the lifting means are acted upon to lower the load into the water, the load being held while it is lowered at least at three points, at least two of which are connected to lifting means of the support structures located onshore, and the third is connected to one from among a submersible barge, a support structure borne by a barge, and a support structure located onshore.

The load may be moved using the support structures located onshore as far as the load-out area.

The support structures are moved synchronously.

"Onshore" has to be understood to mean on land, or on a platform or other kind of pier constituting an advancement onto the water, the platform or other structure resting on piles for example.

In the event of use of a non-submersible barge, the method may include acting on a ballast or on the position of at least one counterweight so as to keep the barge horizontal while the load is being transferred onto this barge, before the barge is moved into its final position in the load-out area.

When there is no barge, the method may include drawing the support structures back along their longitudinal axis to distance them from the load, and thus facilitate the moving of the load away from the dock.

This drawing-back movement can be obtained by virtue of transverse rails on which one or more rams carrying the support structure can move. The method may include retracting the rams engaged in the rails having served to bring the support structure to the load-out position, and positioning the remaining rams in line with the transverse rails.

The method may be implemented by using movement means of the APS and PPU type to ensure the movement of the load and the support structures.

The support structures may thus raise the load, for example to a height less than or equal to 0.5 m, in particular between 10 and 50 cm, while said load is being moved to the load-out area, and the movement can take place using rams connected to temporary anchors; when the anchors at the end of the rams are activated, the extension of the rams can be accompanied by the shoes sliding over rails of the movement paths, by pushing on these anchors; then, the anchors are deactivated, and the rams are retracted so as to move the anchors to a new position, before repeating a cycle of extending/retracting the rams.

The lifting means have for example at least two, better still at least three, even better still at least four, cable jacks.

The load can be transported on land at a small height above the ground, for example just that required to take it up.

The method may comprise the use of wheel transporters such as SPMTs to transport the load from an assembly area to the zone where it can be connected to the lifting means of the support structures.

In an embodiment, said third point is connected to a barge, and the method comprises acting on a ballast of the barge to compensate for a variation of the force exerted by the load on the lifting means of the support structure present on the barge. The ballast may thus serve to keep the barge substantially horizontal. The method may comprise connecting the load at two points at the rear to onshore support structures and to at least one point at the front to a support structure carried by a barge, and moving away the barge from the dock while advancing the support structures closer to an edge of the dock, until the load is completely over the sea, and then immerging the load into the sea.

The invention is very particularly suitable for loading out into the water loads with a height greater than that of the support structures.

BRIEF DESCRIPTION OF THE DRAWINGS

The invention may be better understood from reading the following detailed description of nonlimiting exemplary embodiments thereof and from examining the appended drawing, in which.

DETAILED DESCRIPTION

Figure 14:
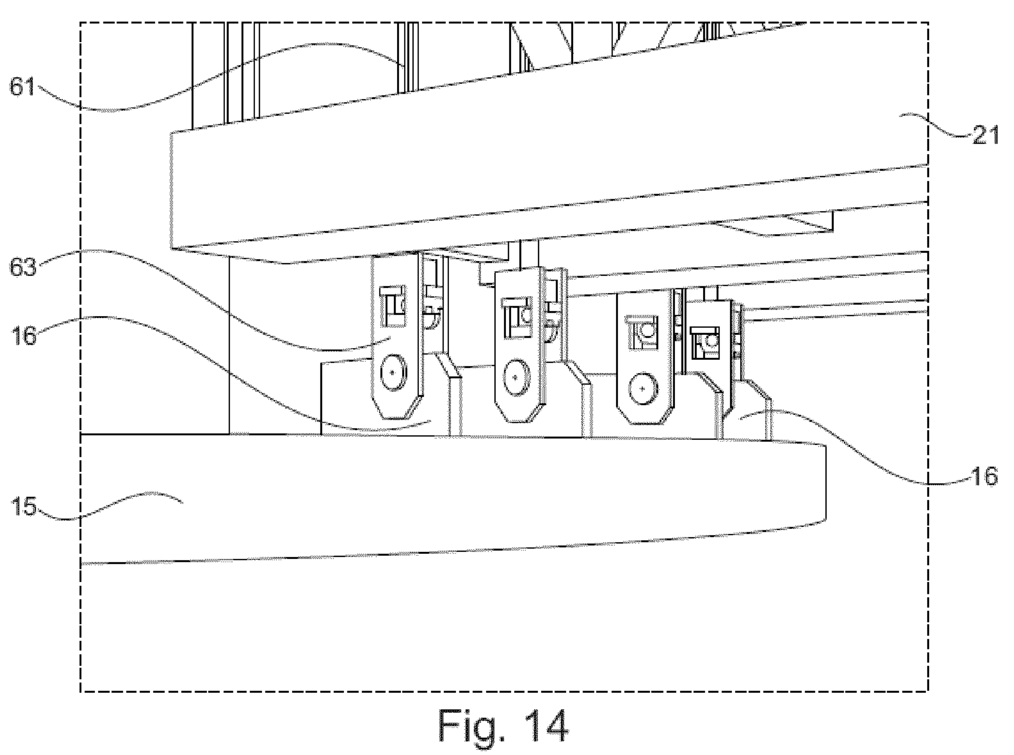
FIG. 14 illustrates the coupling of the lifting means to a support structure with the load.
Figure 21:
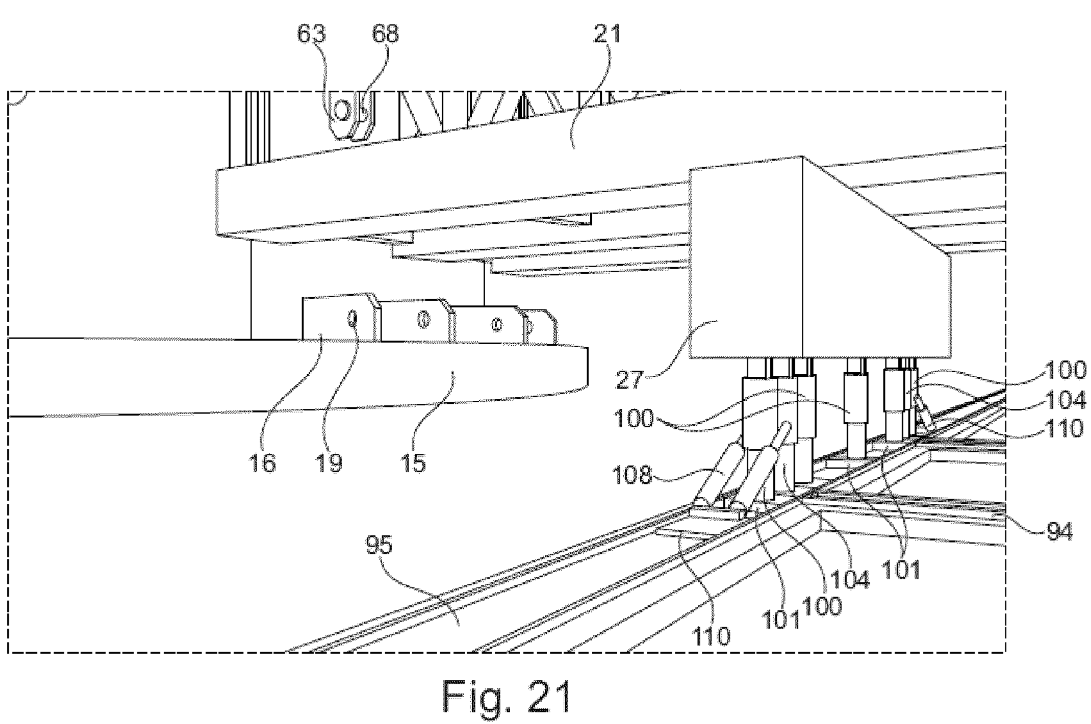
FIG. 21 shows an embodiment detail of the support structure.

FIGS. 14 and 21 show embodiment details of the support structures that are applicable to all the examples.

FIGS. 1 to 4 illustrate a first example of an installation 1 according to the invention, which is intended for the load out into the water of a heavy load 10, constituted for example, as illustrated, by a tripod-type float for a wind turbine, having two feet 11 disposed like the two vertices at the base of an equilateral triangle, and one foot 12 disposed like the third vertex and intended to bear the tower of the wind turbine, the feet 11 and 12 being connected by a beam assembly 14. In the example illustrated, the float is made from steel, but the invention can be applied to any type of heavy load.

At their base, as can be seen in FIG. 14, the feet 11 and 12 have a collar 15 (also referred to as "flange" or "baseplate") which bears vertical lifting lugs 16, the role of which will be specified later on.

The foot 12 intended to possibly carry the tower (not shown) may have an assembly skirt 13 (also referred to as "sleeve") on its upper face.

The installation 1 has two support structures 20, which can be moved on land along respective movement paths 30, these paths 30 having slide rails 31 and support pads 32 and also being referred to as "skidways" in this case.

The pads 32 are temporary support devices which bear the load during the static steps before or after sliding.

The rails 31 may serve as a support for sliding shoes of APS type, for example.

Each support structure 20 located onshore has a latticework girder 21, one end of which bears a counterweight 22 projecting upward from the girder, and the other end of which bears lifting means 60. The height below the girder 21 is a few meters, this being sufficient to house the elements (crossbeams, etc.) necessary for distributing the loads concentrated in the jacks and the bearing shoes to the latticework girder 21 or for interposing SPMTs. This girder 21 thus extends to a small height from the ground, for example less than 5 m, or even less than 3 m or 2 m.

In the example under consideration, these two support structures 20 have their longitudinal axis oriented in the direction of movement along the path 30.

The installation 1 has a barge 50 disposed in the continuation of a central onshore movement path 30, on which the foot 12 can be moved.

In this example, the barge 50 bears a third support structure 20, which differs from the support structures 20 located onshore in that it does not have a counterweight 22.

As illustrated, the support structure 20 present on the barge 50 may be connected to the barge at its rear end, opposite the lifting means 60 and the load 10, via cables 53 which are preferably substantially vertical.

The barge 50 is equipped with a ballast system which makes it possible to compensate the variation in weight it supports while moving the load forward, and thus to keep the barge substantially horizontal.

A first pair of mooring lines 54, as illustrated, may connect winches 57, disposed at the front of the barge 50, to the dock, and a second pair of mooring lines 52 may connect winches 58, disposed at the rear of the barge 50, to the dock. These mooring lines 52 and 54 can be unspooled as the barge 50 moves away from the dock Q, and make it possible to keep the barge in the desired orientation, in particular perpendicular to the dock. Each pair of mooring lines extends to form a V, the outermost mooring lines 52 forming a greater angle between them than the mooring lines 54.

The support structure 20 borne by the barge slightly projects beyond it toward the load in order to enable the lifting means 60 to be attached to the lugs 16 at the base of the foot 12.

The lifting means 60 of the support structures 20 each have a cable jack assembly 61, each provided at the end with a yoke 63 bearing a shaft 68 engaged in the opening 19 in the lug 16, as can be seen in FIGS. 14 and 21.

Figure 13:
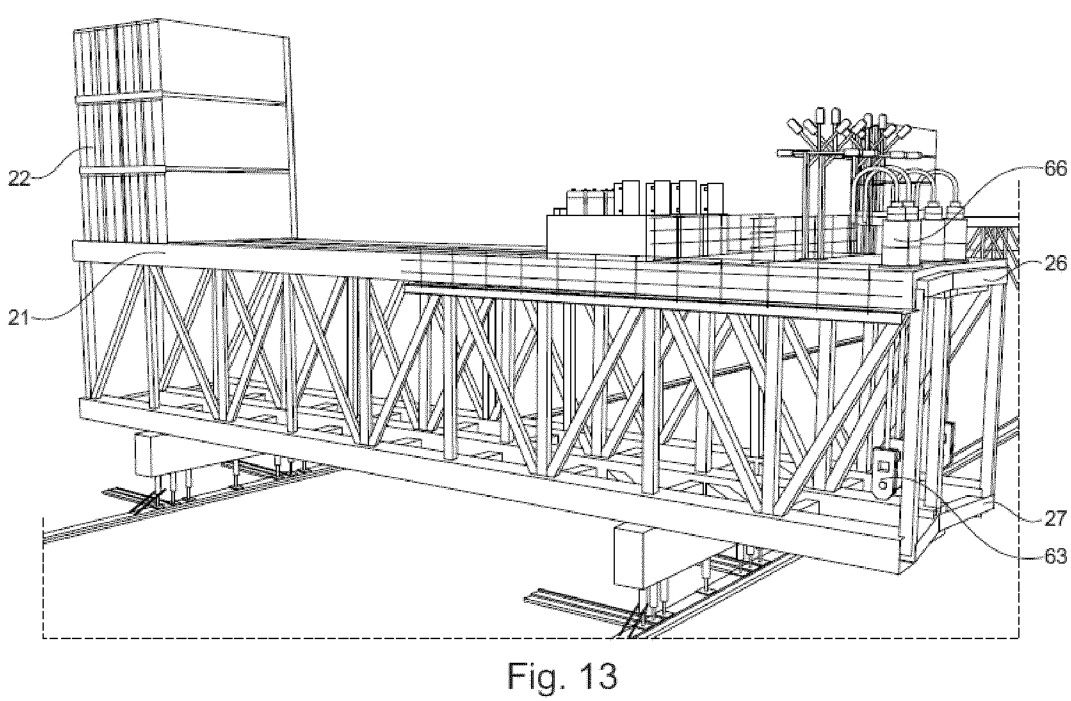
FIG. 13 shows a support structure on its own.

The body 66 of the jacks can be seen more particularly in FIG. 13. In this figure, it can also be seen that the latticework girder 21 of the support structure 20, on the side with the lifting means 60, has upper protective rails 26 and lower protective rails 27 with an outwardly concave overall shape, so as to substantially match the cylindrical shape of the foot 11 or 12 facing them. These protective rails 26 and 27 may be fitted with sliding shoes and/or shock absorbers, for example made from an elastomer material such as Neoprene, so as to facilitate the lowering of the load 10 upon contact with the support structure 20, making it possible to push the load using the support structure and/or to absorb possible impacts between the load and the support structure.

As illustrated in FIG. 21, each support structure 20 may rest, at each rail of the movement path, on feet having rams 100 and 104, the rods of which are provided at their lower end with sliding shoes 101 that travel along on the rail.

Piston rams 108, that bear against movable anchors 110 and can be activated temporarily to lock the anchor in the corresponding rail, constitute pushers (or "PPU" for "Push Pull Unit") that make it possible to slide the rams 100-104 along on the sliding shoes 101 (of APS type, for example) so as to move the support structure. The rams 108 of the PPUs have a double effect and exhibit great compressibility and reduced tensile capacity, enabling forward travel with a nominal load, and reverse travel with a reduced load for disengaging the relieved support structure.

Each support structure 20 may thus rest, via a rail, on a first assembly having a central ram 104 and two adjacent rams 100, on a single foot having a ram 100, and then on a second assembly having three rams, identical to the first. Each of the assemblies of three rams has a set of pushers with piston rams 108, extending respectively toward the front and toward the rear of the base, to move the support structure in opposite directions.

The installation 1 may have (electric, hydraulic or pneumatic) winch cables 29 that connect the rear of the structures 20 to anchors and are intended to relatively quickly cause the support structures 20, once they have been relieved, to travel in reverse on their sliding supports. The pushers PPU can also be used for reverse travel or a slower movement, implementing greater forces.

The installation 1 operates as follows.

Figure 1:
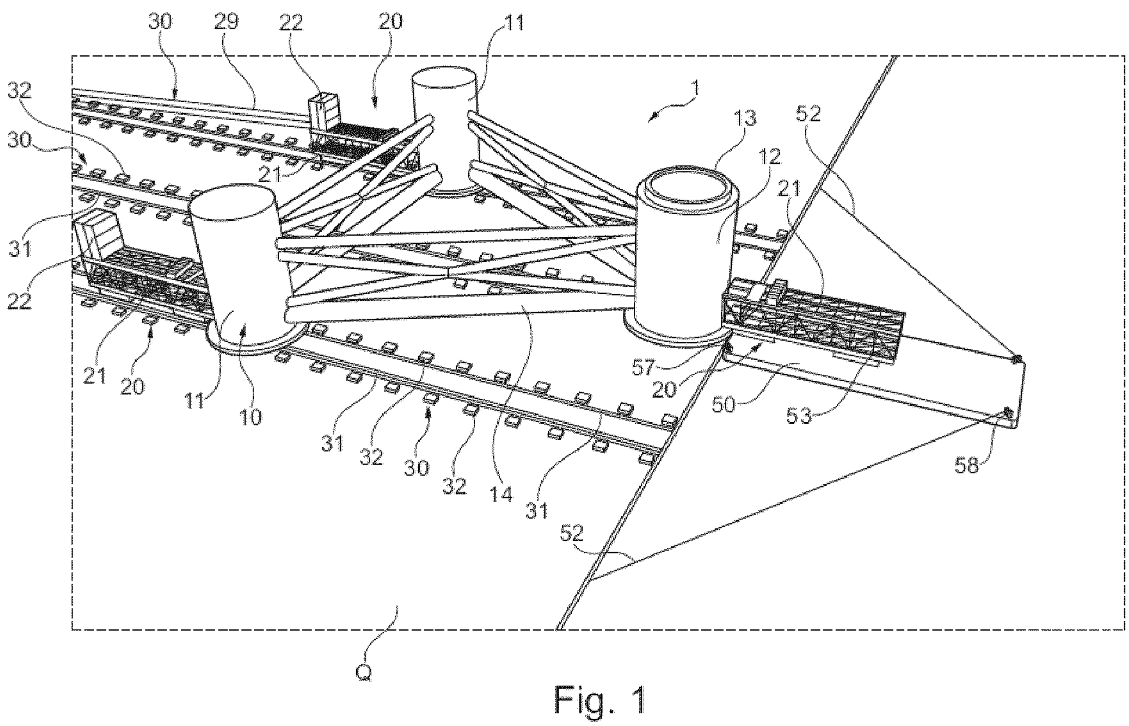
FIG. 1 is a schematic and partial view, in perspective, of a first example of an installation according to the invention, with a non-submersible barge.

The load 10, initially present entirely onshore, as illustrated in FIG. 1, can be moved by suitable means, for example of APS and PPU type as described below, toward the load-out area. During this movement, the support structures 20 travel along rails 31, and the load 10 is taken up by the rams 100, 104 bearing against the sliding shoes 101 (for example of APS type) sliding on the rails 31. During the intermediate stoppage phases (between translational movements), the load 10 can rest on the support pads 32 of the paths 30.

The barge 50 is disposed in the continuation of the central path 30, and the lifting means 60 of the support structure borne thereby are attached to the lugs 16 located at the base of the foot 12.

The barge 50 accompanies the movement of the load 10 by moving away gradually from the dock Q.

Figure 2:
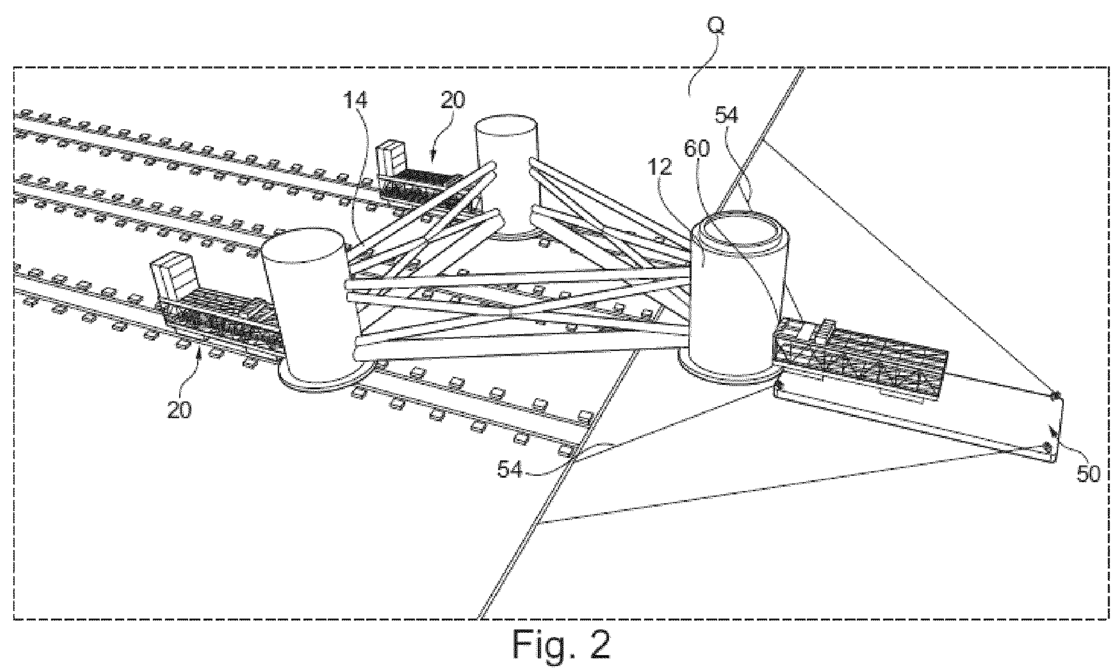
FIG. 2 is a view similar to FIG. 1, after the load has been moved to the load-out area.
Figure 3:
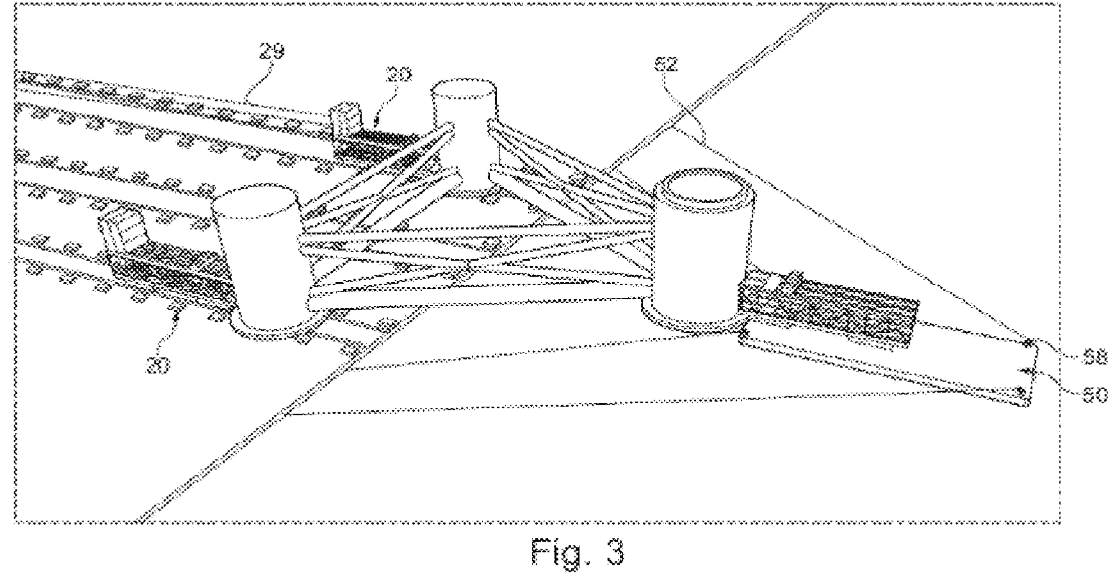
FIG. 3 illustrates the continued movement of the load toward its load-out position.

The mooring lines 52 and 54 are unspooled so as to keep the barge 50 in the desired orientation, as illustrated in FIGS. 2 and 3.

Figure 4:
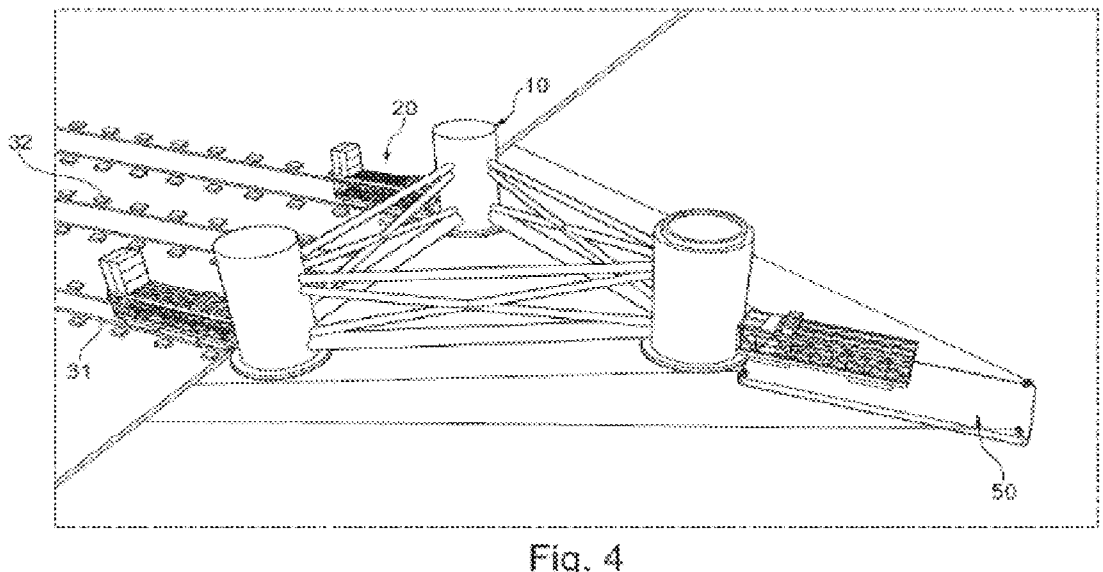
FIG. 4 illustrates the complete arrival of the load at the load-out area.

FIG. 4 shows the load 10 once it has reached its final position within the load-out area. The support structures 20 located onshore then have their end provided with lifting means that extend from the dock. Stops present on the dock (which are not shown) can make it possible to prevent the movement of the support structures in this position. The cable jacks can be actuated gradually to lower the load 10 into the water.

Once the load is submerged, the lifting means 60 of all the support structures can be decoupled from the load, and the barge 50 can be moved away from the load, for example using a ship, while the load 10 is transported toward a storage area or toward its definitive location (for example the wind farm).

A description will now be given, with reference to FIGS. 5 to 11, of a variant installation 1 that still has a barge 50, but this time the barge is submersible.

In this example, the barge 50 is oriented with its longitudinal axis substantially parallel to the edge of the dock, and perpendicular to the central path 30.

This barge 50 may have an extension continuing the central path 30, with rails 31 and support pads 32, so as to enable the foot 12 of the load to move there.

The barge 50 may be connected to the dock by sets of mooring lines 52 and 54, like in the example described above.

Figure 5:
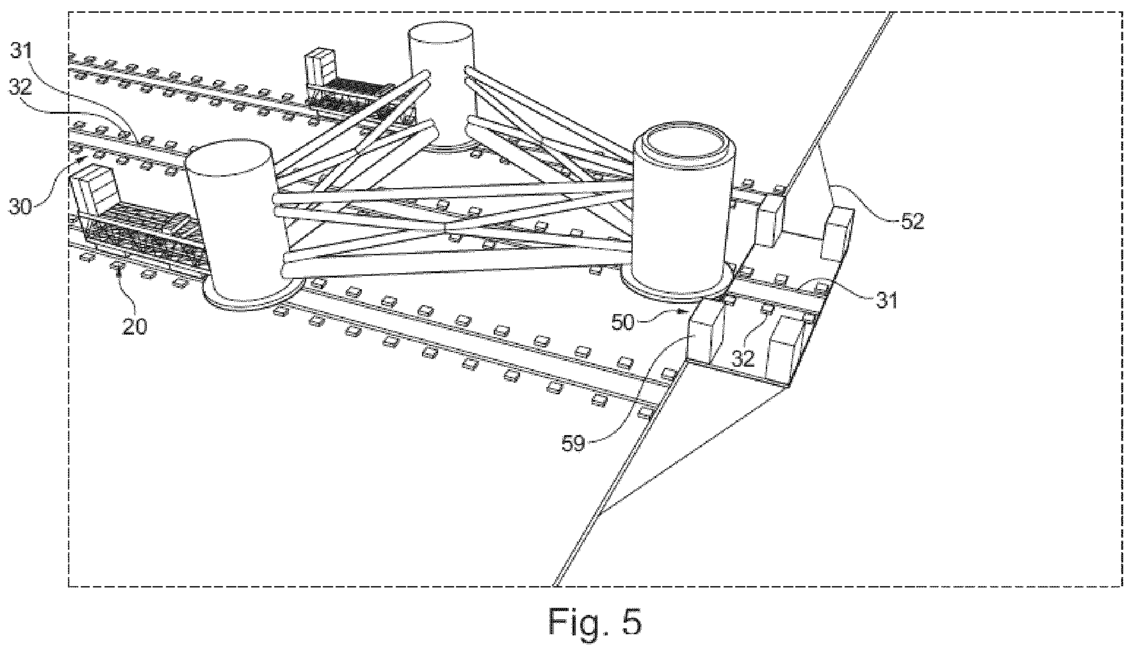
FIG. 5 is a schematic and partial view, in perspective, of a second example of an installation according to the invention, with a submersible barge.

In FIG. 5, the load 10 is shown in a position in which it rests entirely on land. The barge 50 is positioned in the continuation of the central path 30.

Figure 6:
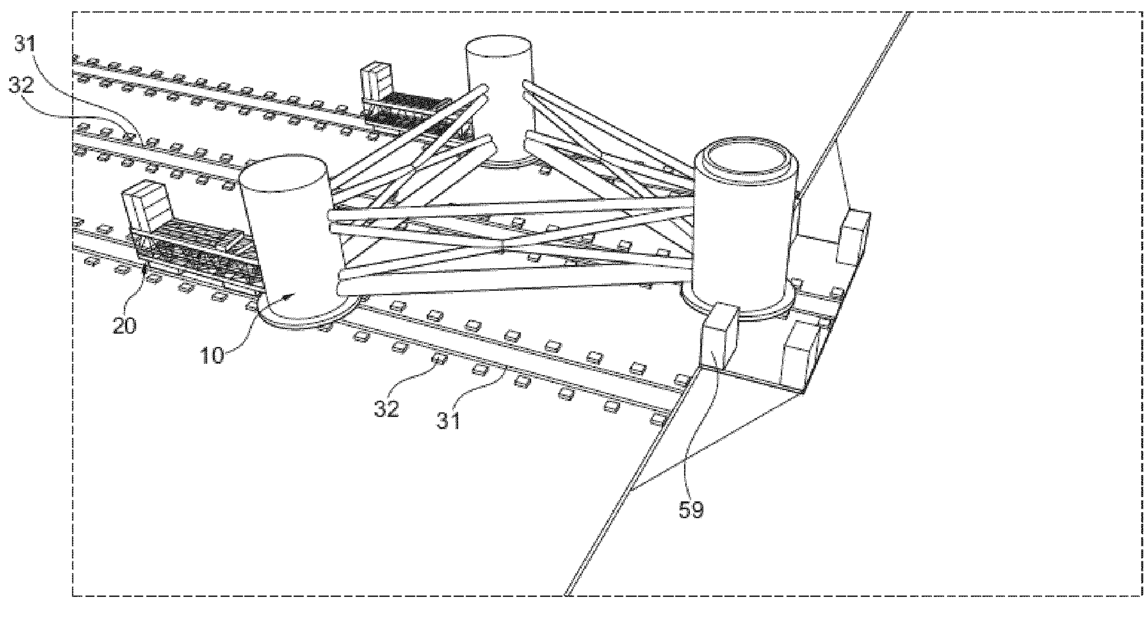
FIG. 6 is a view similar to FIG. 5, after the load has been moved to the load-out area, the barge being kept docked and the load being partially moved onto the barge.
Figure 7:
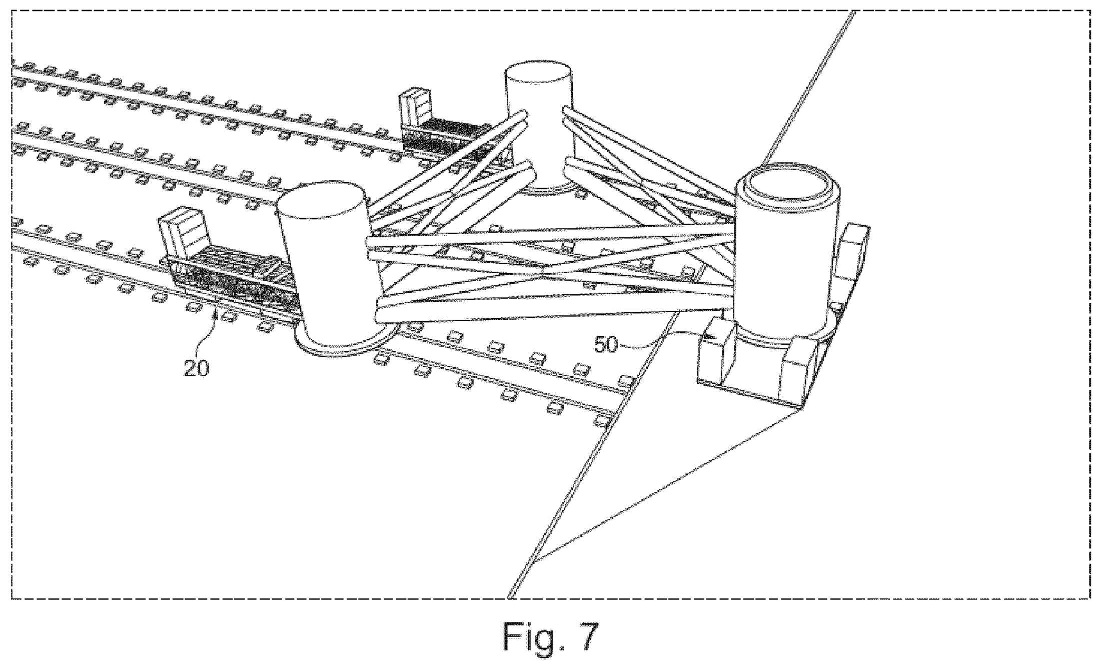
FIG. 7 illustrates the continued movement of the load toward its load-out position, with the barge moving away from the dock.
Figure 8:
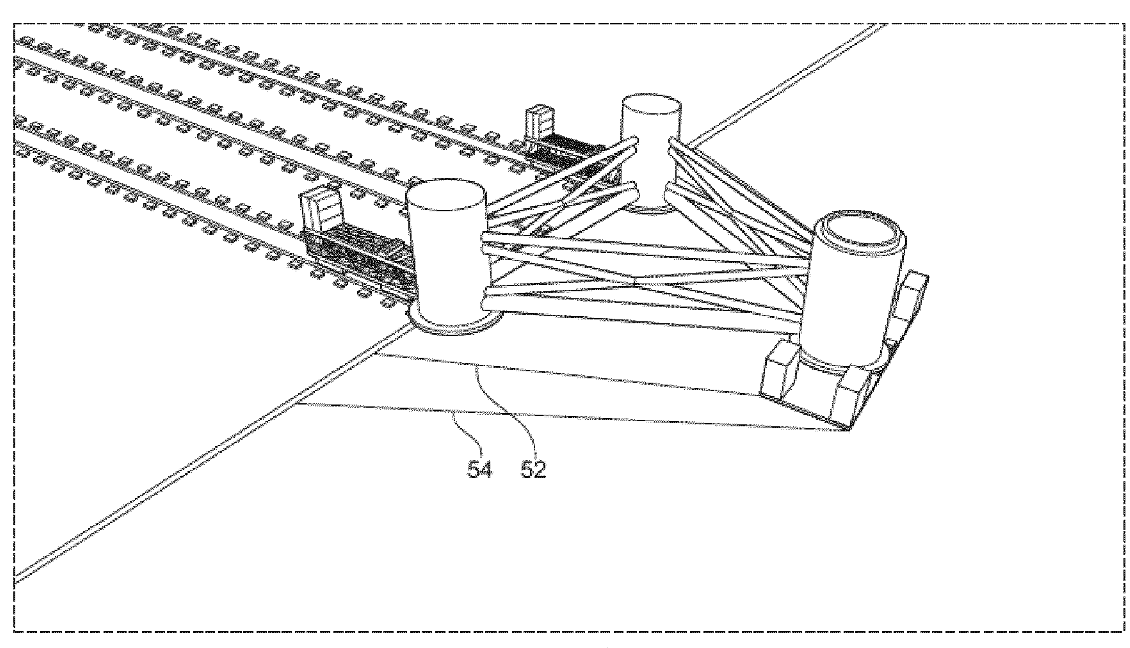
FIG. 8 illustrates the complete arrival of the load at the load-out area.
Figure 9:
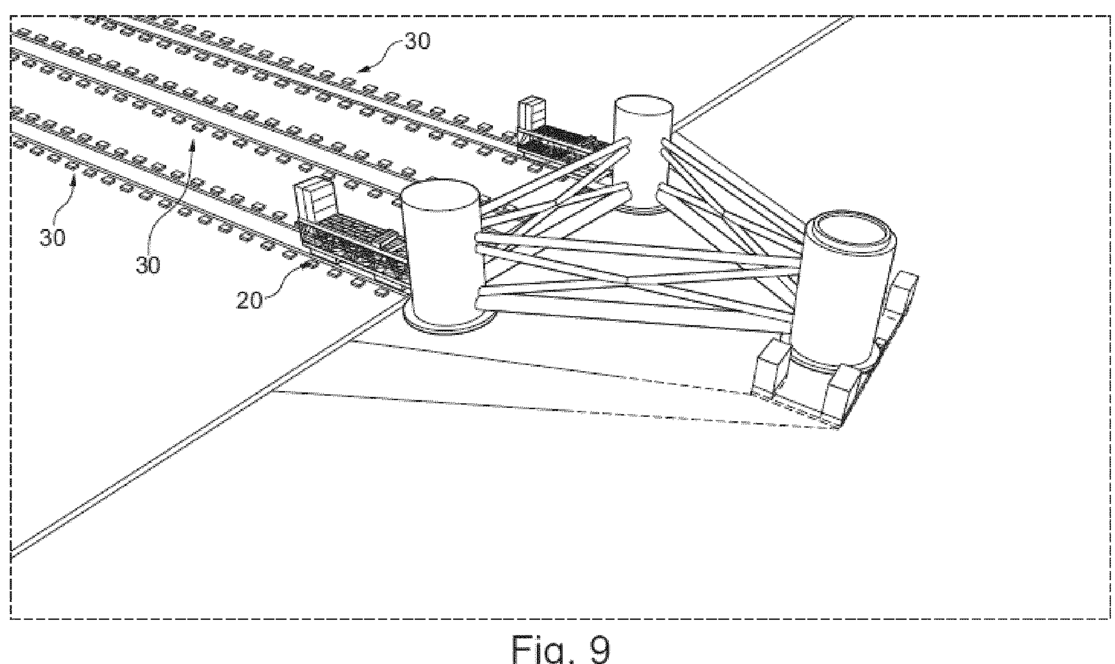
FIG. 9 illustrates the lowering of the load, with gradual submersion of the barge.

The barge 50 is gradually moved toward the load-out area, as illustrated in FIGS. 6 to 8; first of all, the foot 12 slides onto the barge 50, while it is held against the dock. To that end, the rails 31 bearing the sliding shoes (of APS type, for example) used to move the foot 12 are sufficiently continuous between the onshore section and that present on the barge. Once the foot 12 is entirely on the barge 50, the latter is moved away from the dock as the feet 11 move close to the load-out area. The barge 50 is moved passively under the effect of the onshore movement of the load.

FIG. 8 shows the load 10 once it is entirely within the load-out area; the support structures 20 adjacent to the feet 11 extend from the dock.

Figure 10:
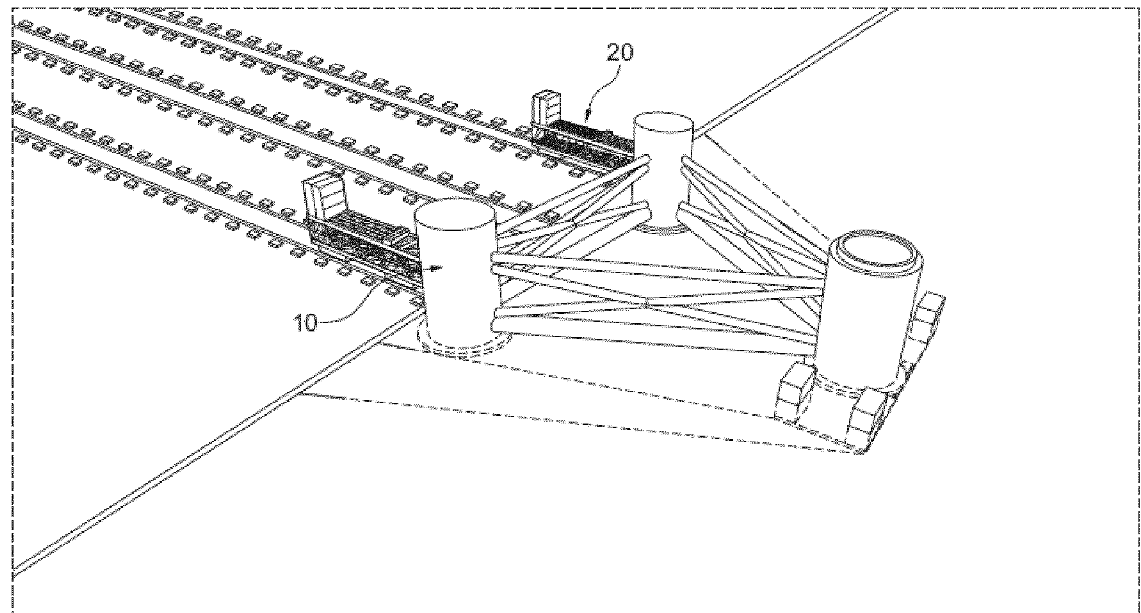
FIG. 10 illustrates the continued submersion of the load.
Figure 11:
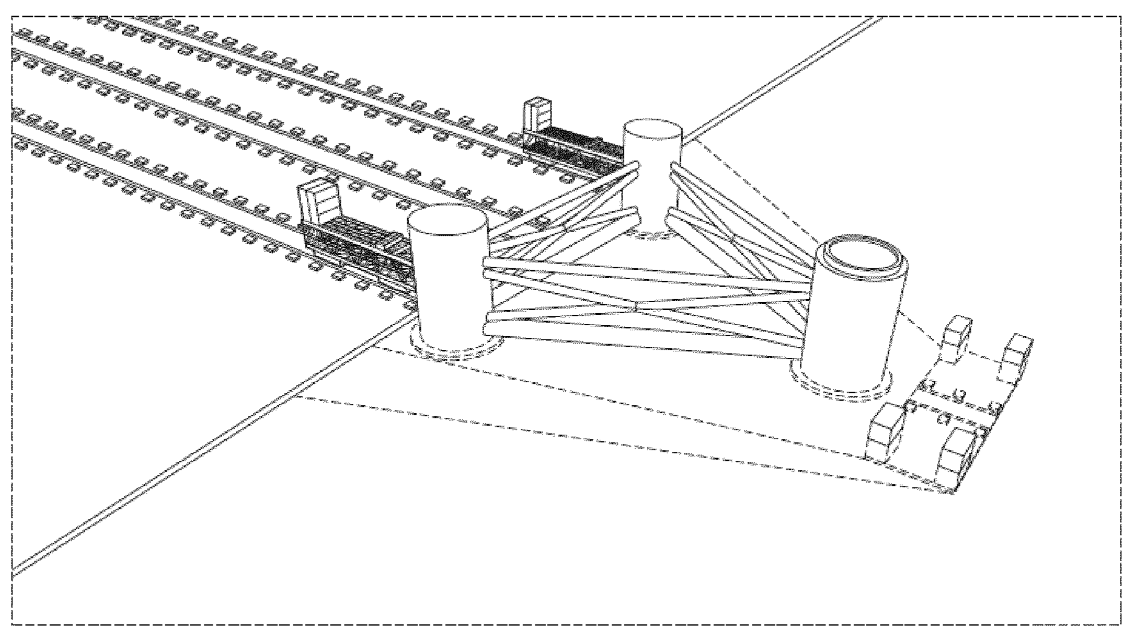
FIG. 11 illustrates the withdrawal of the submerged barge.

The lifting means 60 of these support structures can then be actuated to lower the feet 11, and the barge 50 is gradually submerged at the same time, so as to lower the foot 12, as illustrated in FIGS. 10 and 11.

The towers 59 with which the 4 corners of the submersible barge 50 are equipped are still partially out of the water and make the barge hydrodynamically stable once it is submerged.

Once the load 10 is floating, the lifting means 60 can be decoupled from the load 10 and the barge 50 moved away therefrom.

FIG. 11 illustrates the disengagement of the barge 50 from underneath, which releases the load 10.

Figure 12:
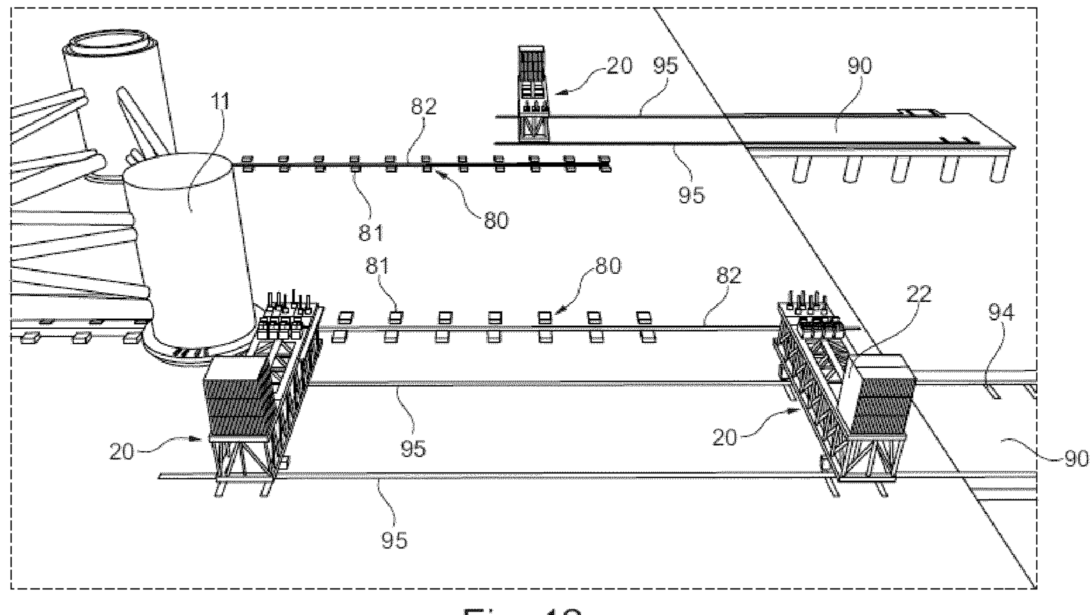
FIG. 12 is a schematic and partial view, in perspective, of a third example of an installation according to the invention, without a barge.

A description will now be given, with reference to FIG. 12, of a variant installation 1 without a barge.

In this variant, the dock is continued by two piers such as platforms 90 on piles, extending above the water, on either side of the load-out area.

The dock has movement paths 80, on which the load can be moved, for example by sliding, these paths having for example slide rails 82 and temporary support pads 81.

The installation 1 has three support structures 20, two of which travel along on the slide rails 95 extending as far as the first platform 90 and onto it, and the third of which travels along on two other rails 95 extending as far as the second platform and onto it.

The lifting means 60 of the two first support structures can be attached to the lugs 16 at the base of the feet 11, and those of the third to the lugs 16 at the base of the feet 12. The longitudinal axis of the support structures 20 is oriented perpendicularly to the rails 95.

Figure 15:
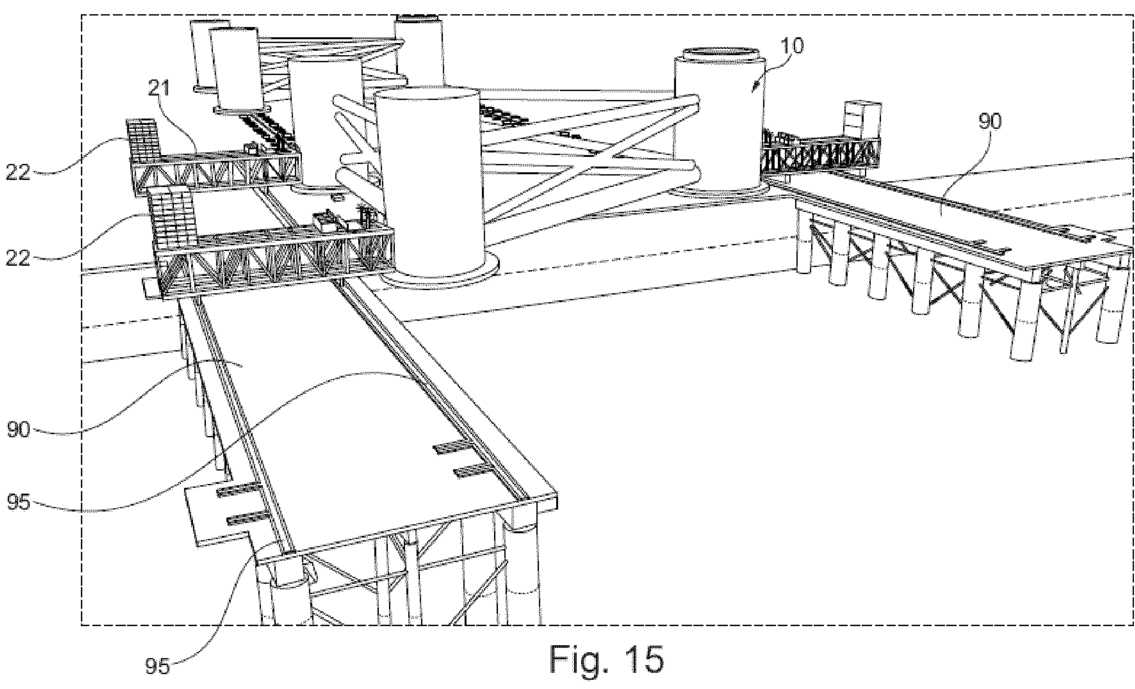
FIG. 15 illustrates the movement of the load to the load-out area, using the installation of FIG. 12.
Figure 16:
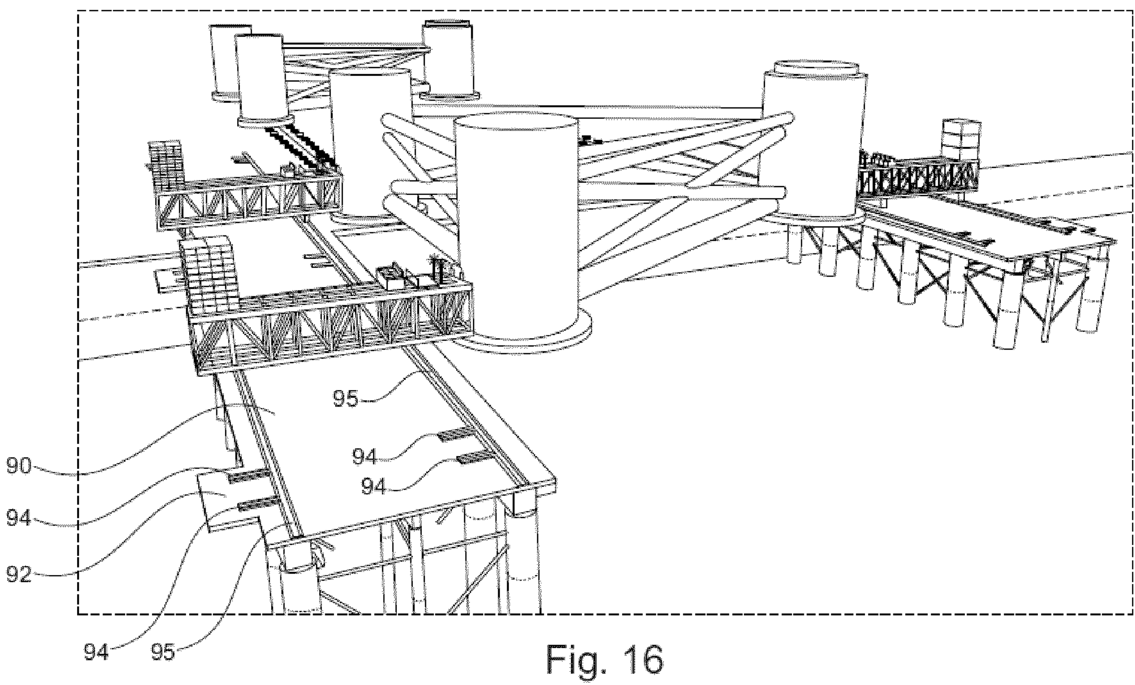
FIG. 16 illustrates the continued movement of the load toward the load-out area.
Figure 17:
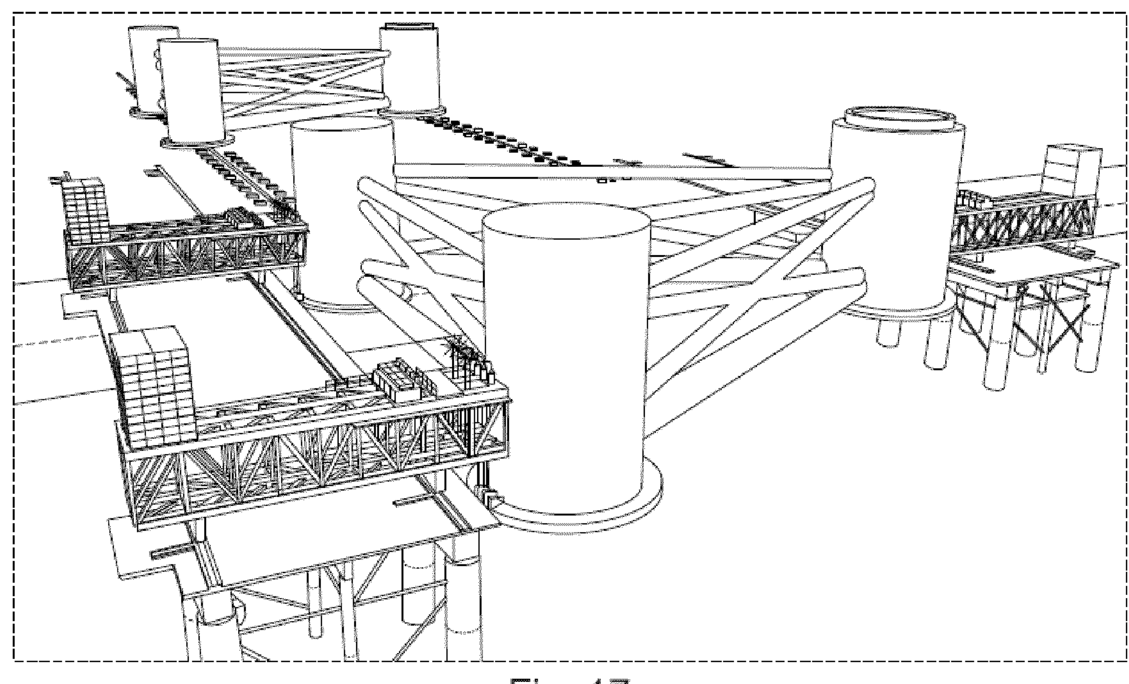
FIG. 17 illustrates the complete arrival of the load at the load-out area.

The movement of the load 10 accompanied by that of the support structures 20 is illustrated in FIGS. 15 to 17. This movement is performed while the feet 11 and 12 are attached to the lifting means 60 and raised by the support structures in a translational movement on the rails 95.

FIG. 17 shows the load once it has fully reached the load-out area. It is then suspended at the lifting means 60.

Figure 18:
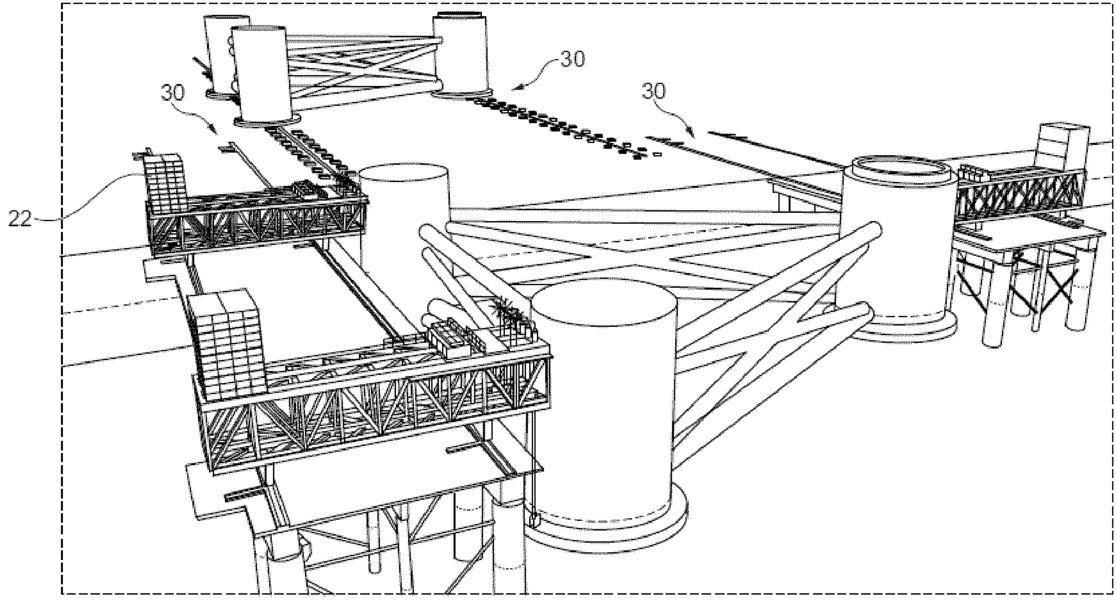
FIG. 18 illustrates the lowering of the load.
Figure 19:
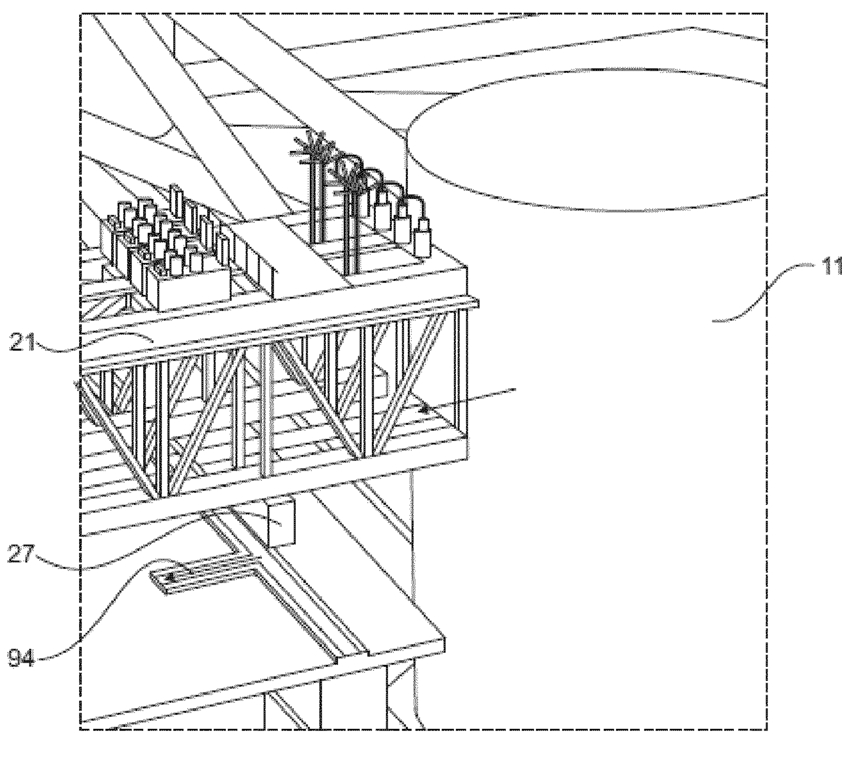
FIG. 19 illustrates the movement of the support structures after submersion of the load.
Figure 20:
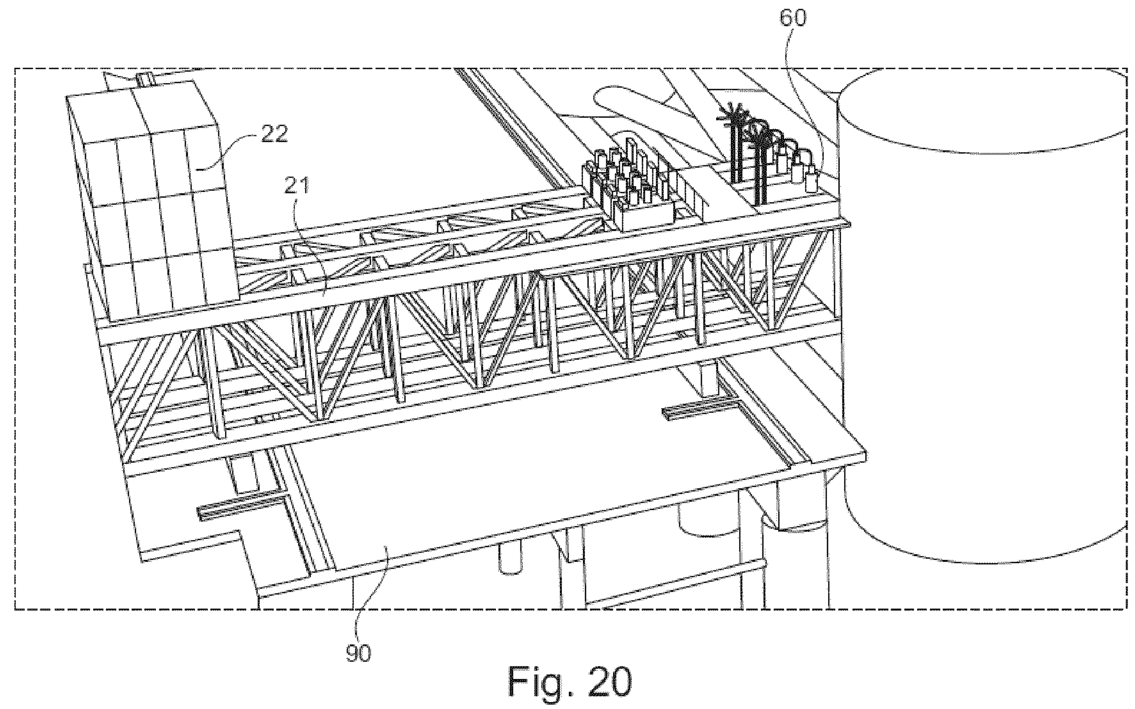
FIG. 20 shows the support structure after it has been drawn back.

The latter may be gradually actuated to lower the load into the water, as illustrated in FIG. 18. Once the load 10 is floating, the lifting means 60 can be decoupled from the feet 11 and 12.

The support structures 20, the end provided with the lifting means 60 of which extends above the water, can be drawn back so as to enable passage of the load 10 and make it possible for a ship to drive it toward a storage area or its permanent location (for example the wind farm).

In the example illustrated, this drawing back is performed by virtue of the transverse slide rails 94, visible in FIG. 21 in particular, perpendicularly meeting the rails 95.

Figure 22:
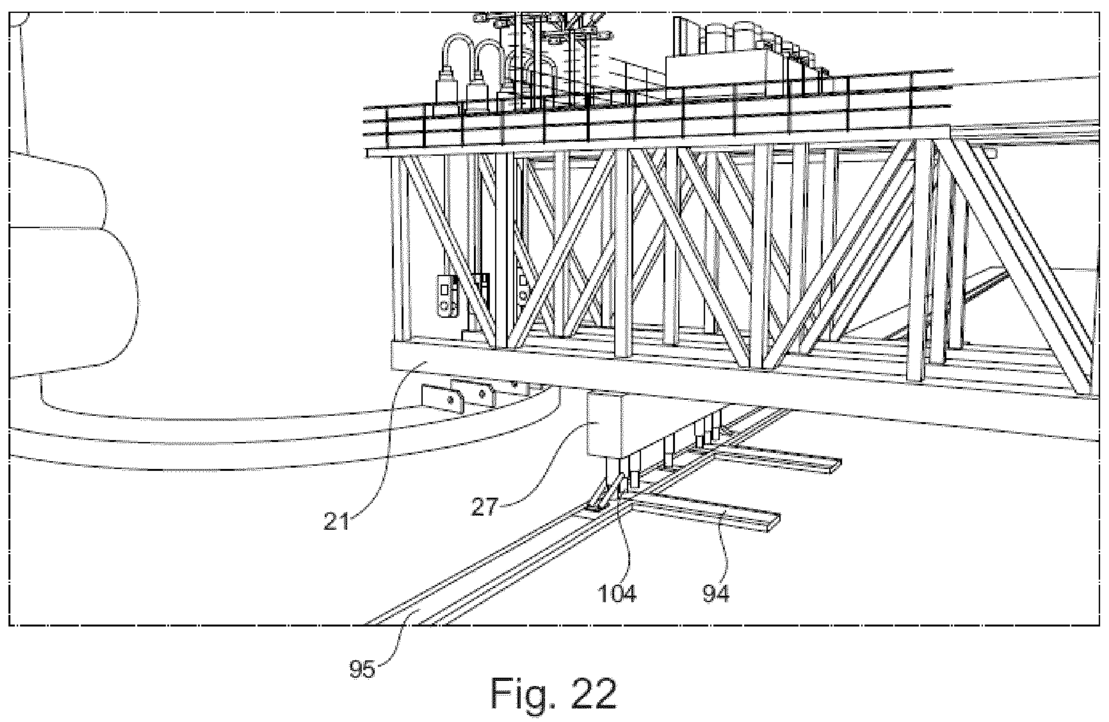
FIG. 22 illustrates the positioning of the support structure of the installation of FIG. 12 with a view to disengaging it.

When the support structures 20 arrive at the load-out position for the load, the central rams 104 are positioned in line with the rails 94, as illustrated in FIG. 22.

Figure 23:
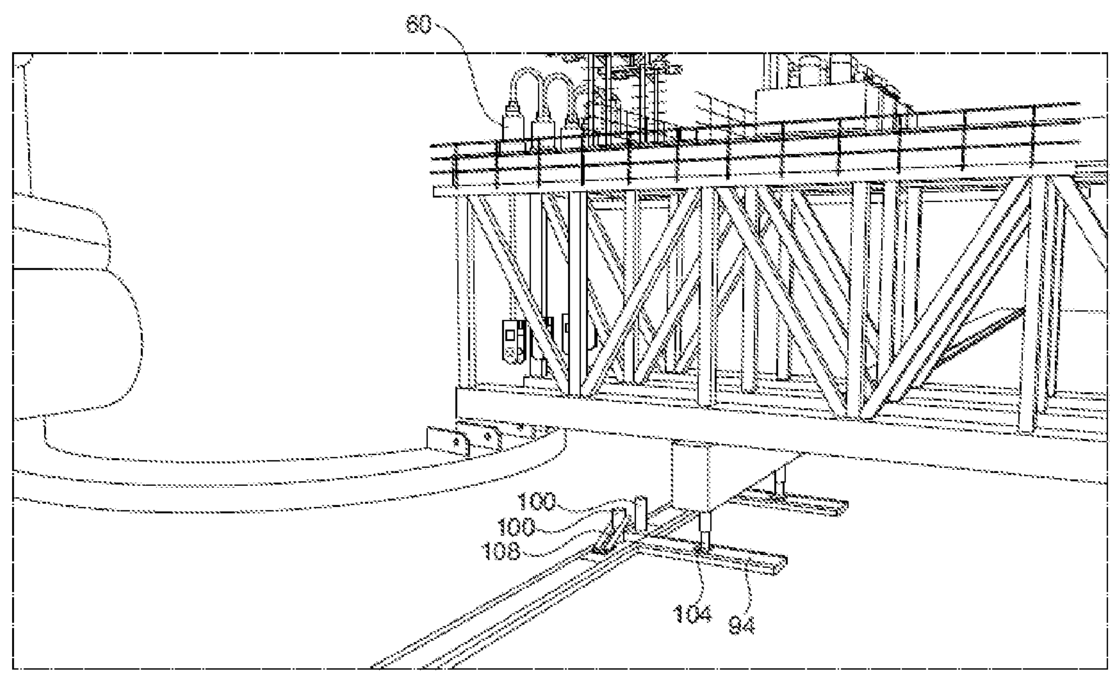
FIG. 23 shows the support structure after it has been drawn back in order to disengage it.
Figure 24:
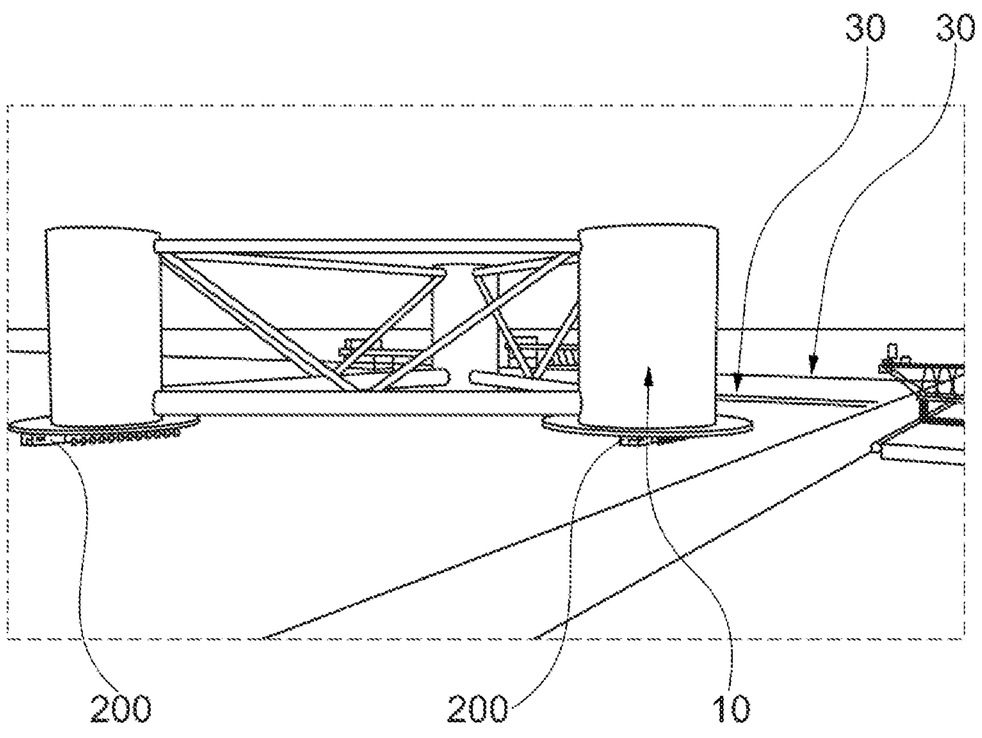
FIG. 24 is a perspective view of a variant embodiment of an installation according to the invention.
Figure 25:
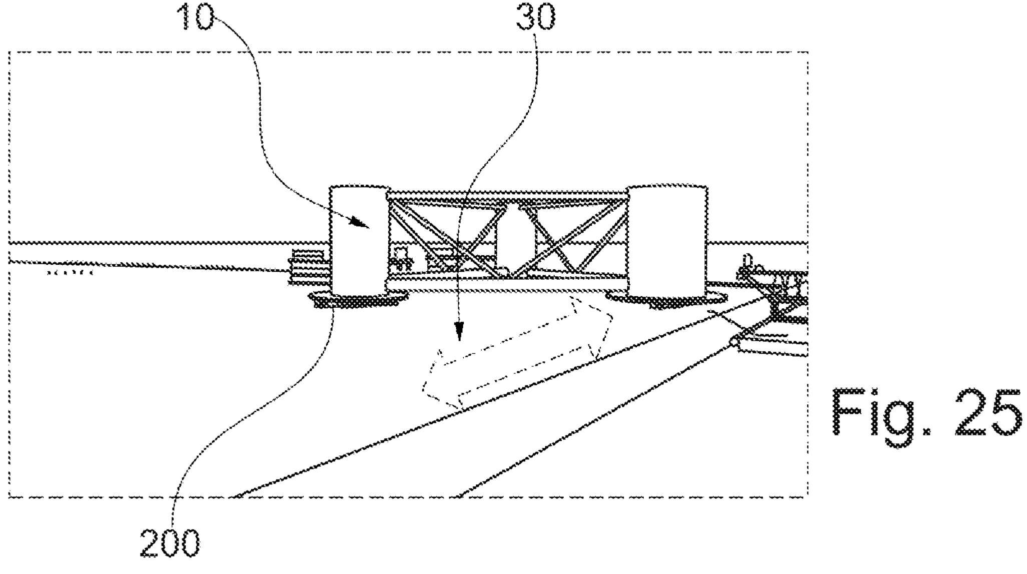
FIG. 25 is a view similar to FIG. 24 during displacement of the load along a corresponding movement path.
Figure 26:
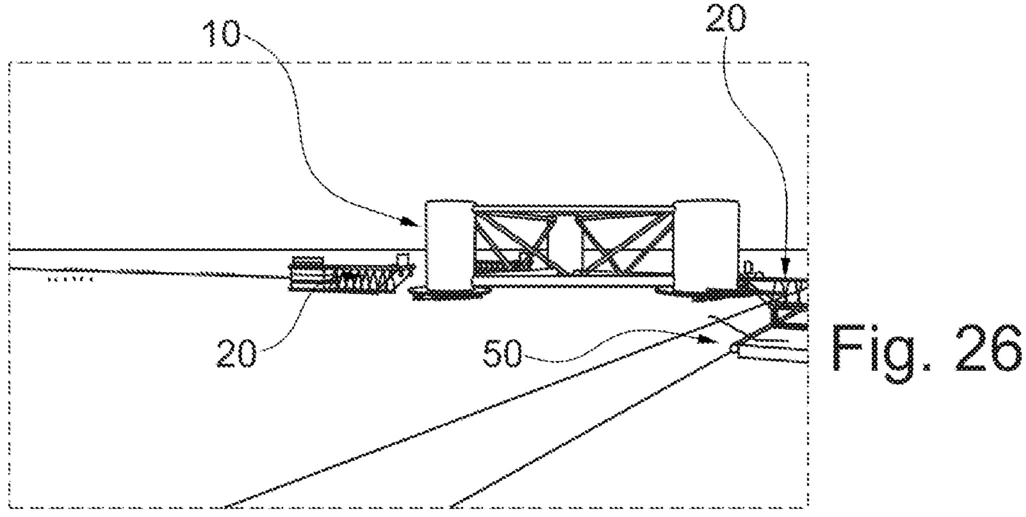
FIG. 26 is a view similar to FIG. 25 after arrival of the load at a place where it is intended to be hoisted by the support structures.
Figure 27:
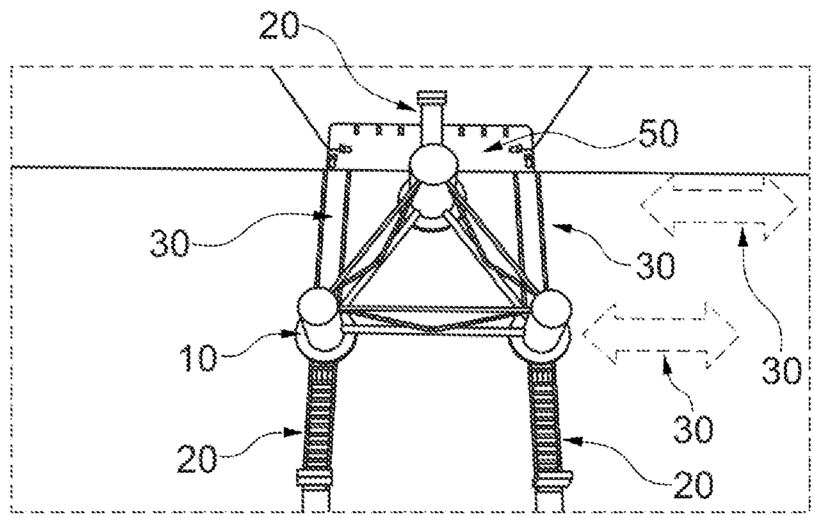
FIG. 27 shows the load in the position of FIG. 26 from above.

Once the load 10 has been loaded out into water, and the lifting means have been decoupled, the weight that the rams 100 and 104 need to support is that of the support structure 20 alone, and the rams 100 can be retracted, such that the support structure is now carried only by the rams 104. The rams 100 remain in place in each rail 95, whereas the rams 104 can be moved in the rails 94 by any suitable motor means, for example using additional rams of PPU type (not apparent in the figures) or a winch anchored back from the transverse rail 94, for each of the rams 104, thus making it possible to move the support structure away from the load 10, as illustrated in FIG. 23.

Once the load 10 has moved away from the load-out area, it is possible to move the support structure 20 in reverse so as to take up the next load 10.

In all the examples above, the support structures 20 can be easily brought out of use and taken away by a ship to another site.

Needless to say, the invention is not limited to the examples that have just been described.

The lifting means 60 may be realized in a different way than with cable jacks, for example with other jacks or with winches.

The load 10 may be different, for example of tetrapod type, and be made from metal or of other materials. The invention thus makes it possible to take up a metal jacket of any shape, but also other concrete structures with or without a very tall metal tower, with or without its generator (wind turbine nacelle, rotor and blades).

The wind turbine tower does not have to be carried by a floating foot. It may be carried by a central base, carried by a latticework structure connected to feet/floats, or by a fourth foot/float in the center. In a variant of the installation of FIG. 1, the ballast system of the barge 50 is replaced and/or supplemented by a counterweight system that is movable on the barge from the front to the rear and vice versa.

In the figures, the lifting means are attached to the load by way of lifting lugs borne on a collar present at the base of the cylindrical part of the foot; as a variant, the attachment is performed in a different way, for example by way of lifting lugs attached directly to the cylindrical part of the foot or in yet another way, by any suitable disposition.

The invention is not limited to particular means for moving the load and/or the support structures toward the load-out area; it is possible to use, for example, transportation means of SPMT type, transportation means with PPU and sliding shoes made from PTFE, or still others.

Where appropriate, the submersible barge may interact with a support system fixed underwater, making it possible to control its descent, thereby making it possible to avoid having to manage entrance into or exit from the water while the barge is being submerged/raised.

In the variant embodiment of FIGS. 24-40, the load 10 is assembled onshore in an assembly area and transported on the ground to a second area where the load will be connected to the support structures 20.

This transportation is carried out along movement paths 30, for example defined by the concrete surfaces of the dock, by wheel transporters 200 such as SPMTs.

The installation comprises two other movement paths 30 that extend generally perpendicularly to the first ones and that may each comprise a pair of rails.

As shown in FIGS. 24-27, when the load reaches the second area, two feet of the load 10 extend over the rails, close to corresponding support structures 20 moving on the rails, and the third feet is close to a barge 50 provided with a support structure 20.

Figure 28:
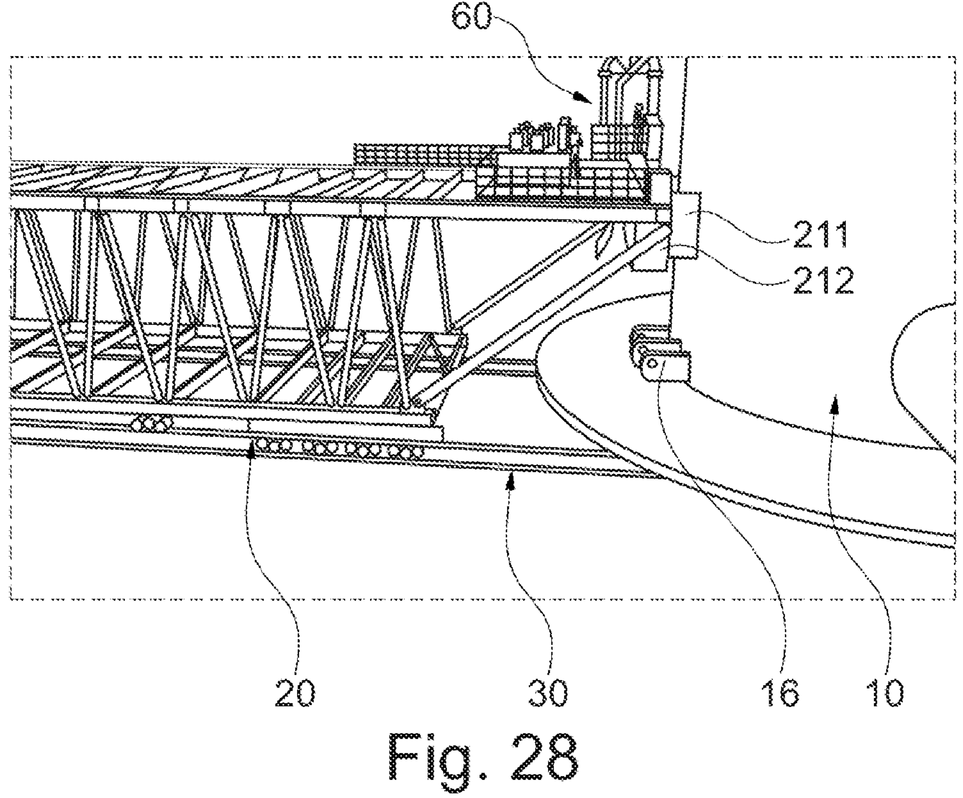
FIG. 28 illustrates the positioning of a support structure adjacent the load for hoisting the latter.
Figure 29:
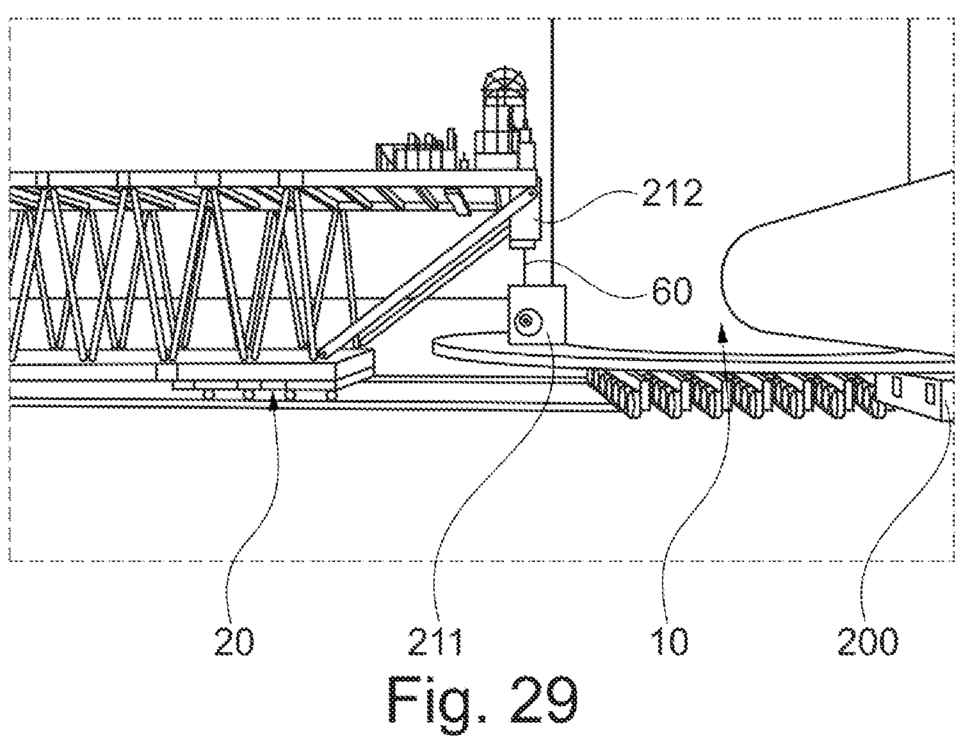
FIG. 29 illustrates the connection of the lifting means of the support structure with the load.

FIGS. 28 and 29 illustrate the connection between one of the lifting structures 20 and the load 10.

As shown in FIG. 29, a box 211 is fixed to the load over the lugs 16 and the support structure 20 is provided with a pair of guides 212 that are configured to interfere with the side walls of the box 211 when the load is fully lifted, to block lateral displacement of the load relative to the support structure 20 (i.e. in a direction generally transverse to the direction the load is moved from onshore to offshore while hoisted by the support structures). The guides 212 may have diverging lower parts, to facilitate the engagement therebetween of the box 211 when the latter moves up.

As shown in FIG. 28, the box 211 can be held by the support structure 20 before it is brought down on the load 10 and fixed thereto. The box 211 can be moved down using the same cables of the lifting means 60 as those that are used afterwards to lift the load 10.

Figure 30:
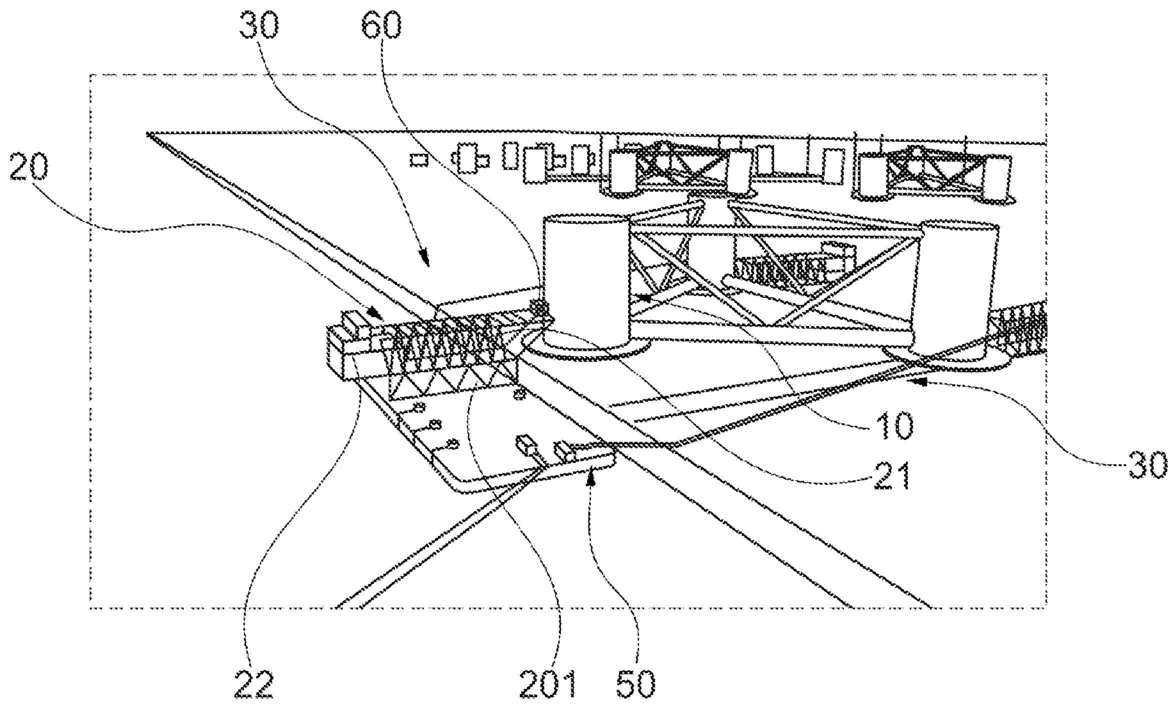
FIG. 30 shows the load connected to the lifting means.
Figure 31:
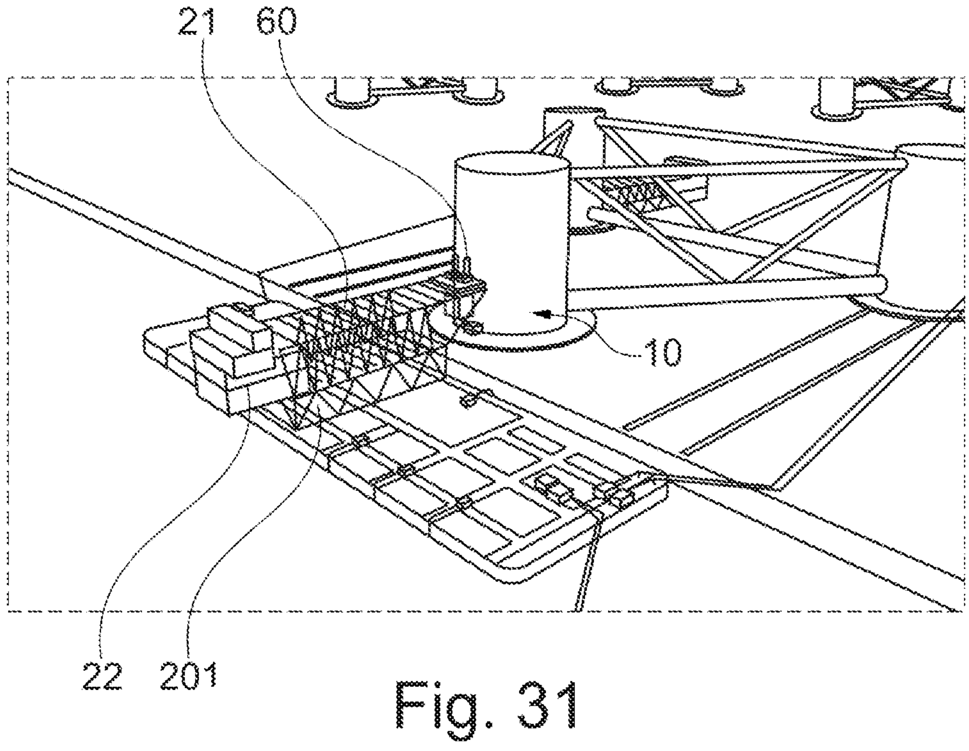
FIG. 31 is a view illustrating an example of repartition of the water in the ballast compartments of the barge.

As can be seen on FIGS. 30-31, the support structure 20 carried by the barge 50 may comprise a base 201 extending substantially over the width of the barge 50. A girder 21 rests on the base 201 and extends in cantilever fashion beyond either end of the base.

A counterweight 22 is present opposite the end of the girder 21 adjacent the load 10.

Figure 32:
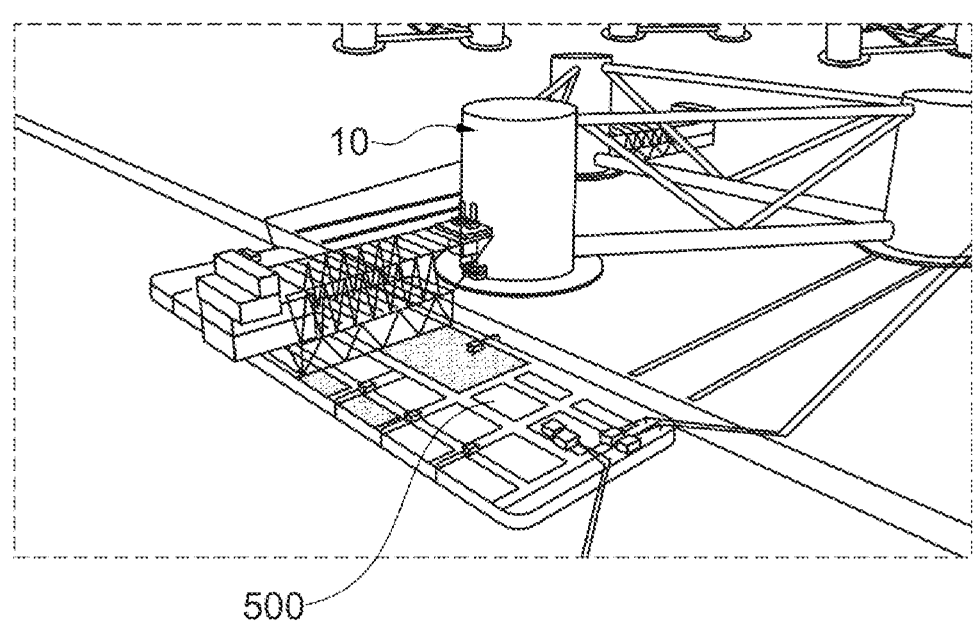
FIG. 32 is a view similar to FIG. 31 during pumping out of the water from some ballast compartment(s)
Figure 33:
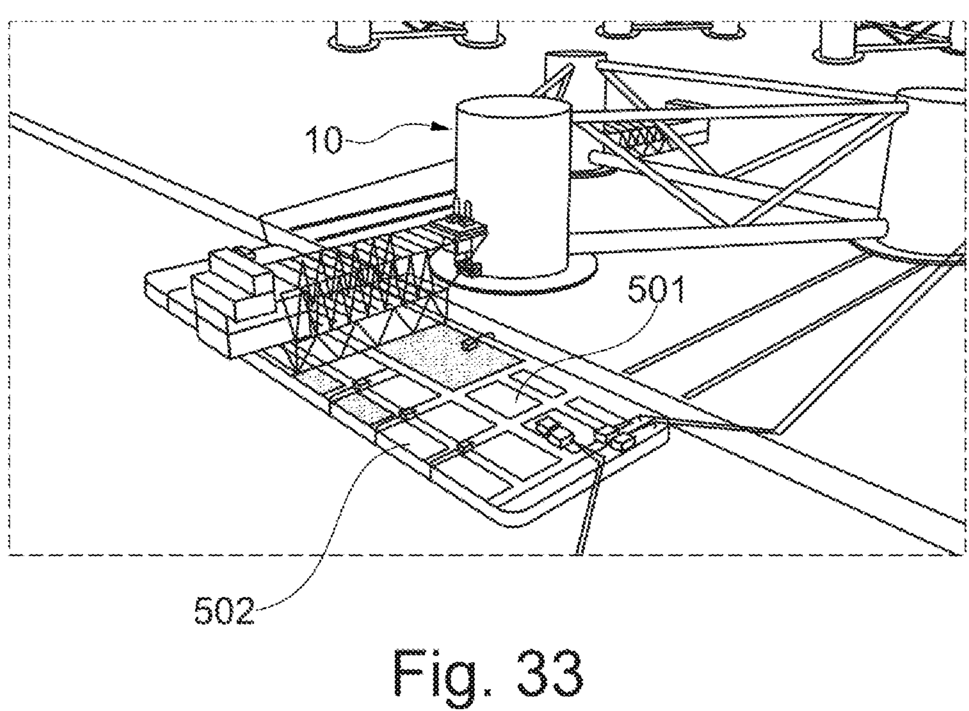
FIG. 33 is a view similar to FIG. 31 illustrating the possibility to adjust the level in ballast compartments of the barge.

As shown in FIGS. 32 and 33, the barge 50 comprises ballast compartments 500 for adjusting the floatability of the barge 50.

For example, the barge may comprise at least one compartment 501 adjacent the load 10 and at least one compartment 502 opposite the load, into which water can be pumped in while being pumped out compartment 501 for compensating the forces induced by the hoisting of the load. The barge 50 and load 10 may be equipped with sensors such as inclinometers and effort gauges and the installation may comprise at least one automate to control based on signals received from these sensors the pumps of the barge and lifting means as well as counterweights positions to maintain the barge and the load horizontal. The at least one automate may allow manual override.

Figure 34:
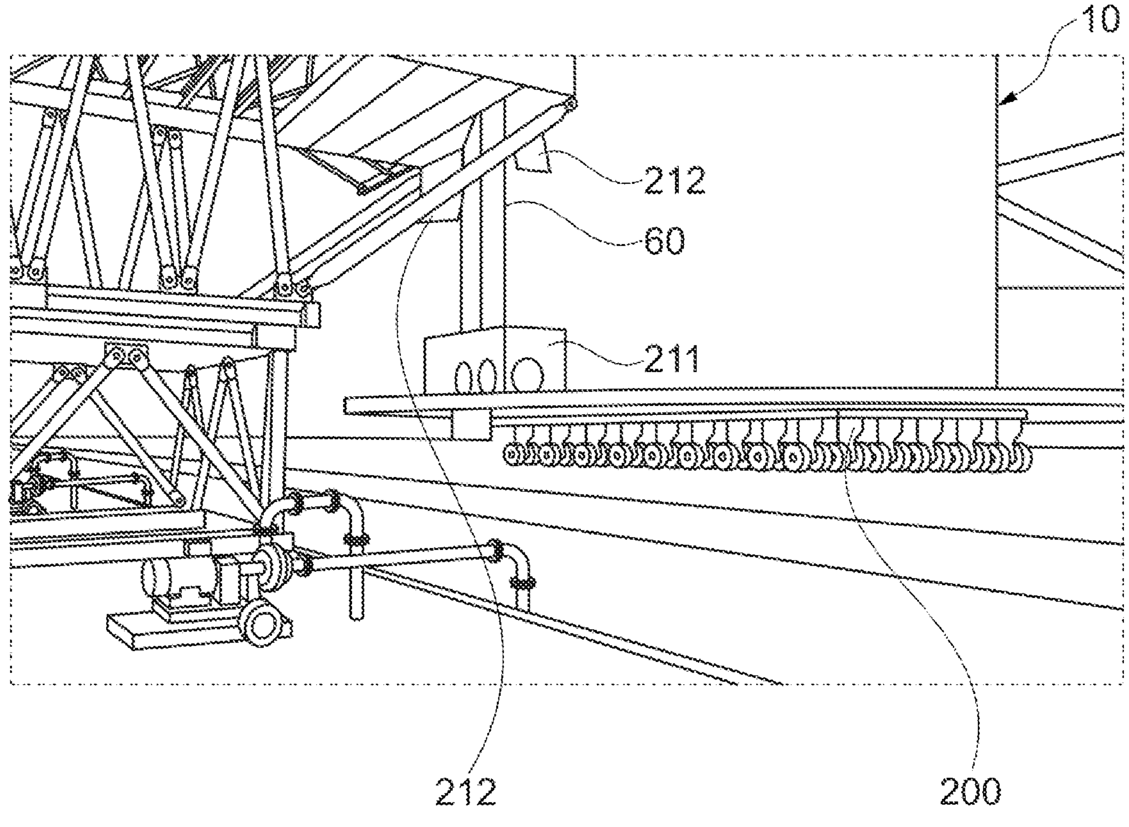
FIG. 34 shows the load connected to the lifting means of the support structure present on the barge while the load is still resting on the SPMTs.

FIG. 34 shows the load before it is lifted above the wheel transporter(s) 200.

Figure 35:
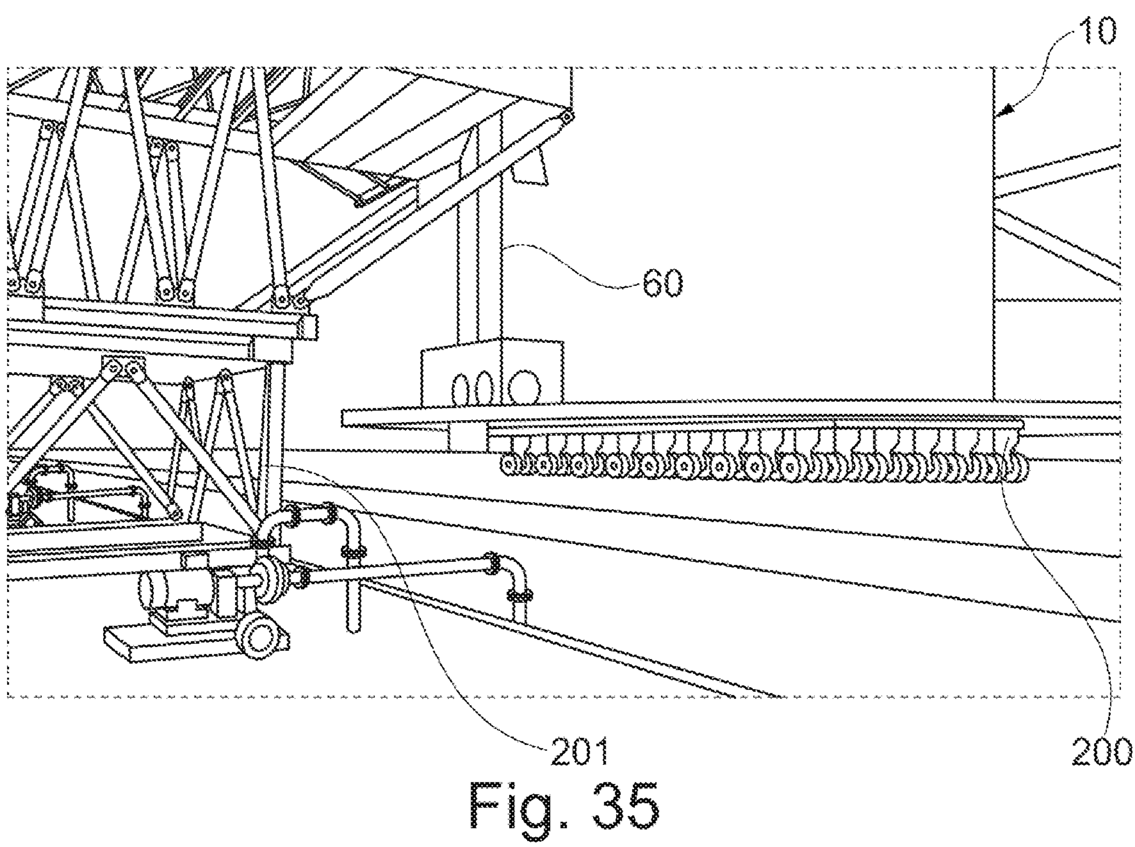
FIG. 35 is a view similar to FIG. 34 after the load has been raised and in presence of variation of the sea level due to the tide.

FIG. 35 illustrates a variation of the sea level. The cable length of the lifting means 60 is long enough to guarantee that the load can be lifted whatever variations of the sea level due to the tide and the cable speed when the load is lifted or brought down is greater than the speed of variation of the sea level due to the tide; for example, the cable speed is about 15 m/h while the variation of the sea level due to the tide is about 2 m/h.

Figure 36:
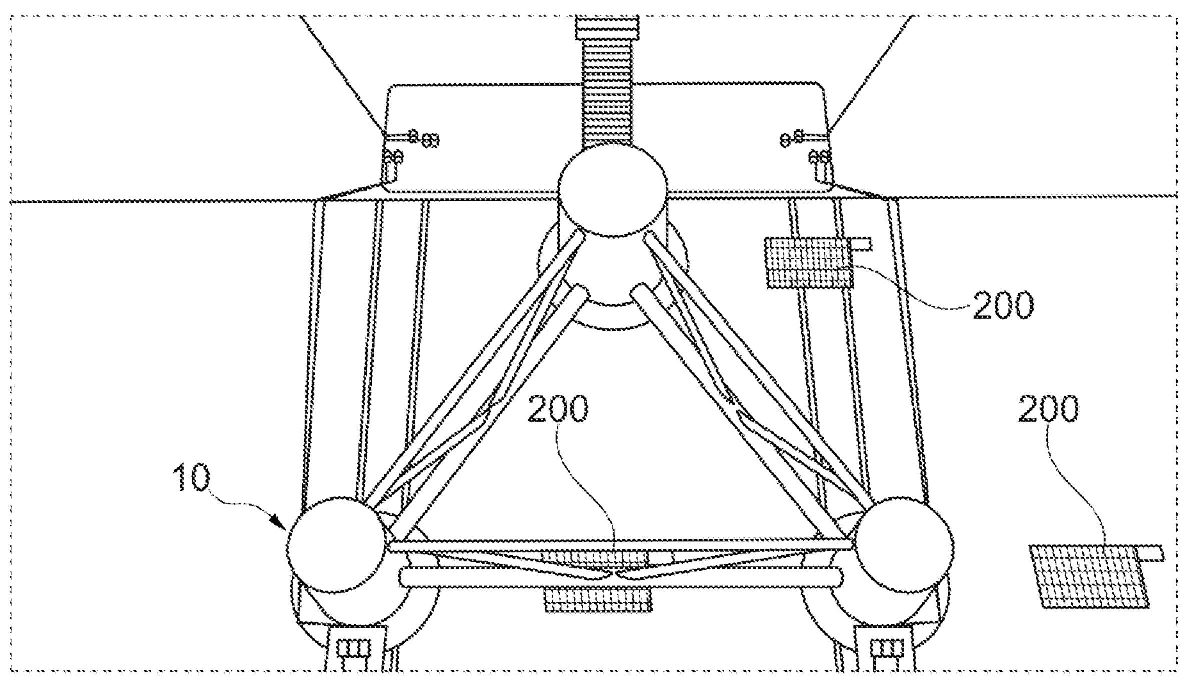
FIG. 36 is a top view illustrating the removal of SPMTs from under the load.

FIG. 36 illustrates the removal of transporters 200 once the load has been lifted by the lifting means 60 of the support structures 20.

Figure 37:
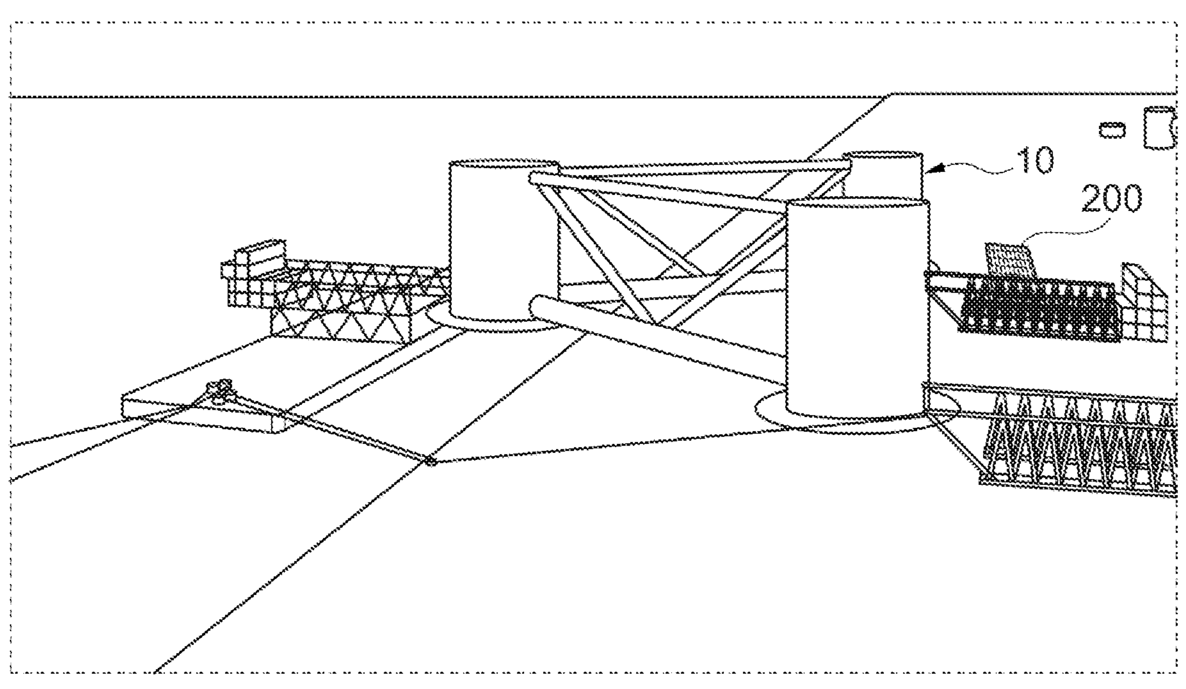
FIG. 37 illustrates the displacement of the load toward the sea.
Figure 38:
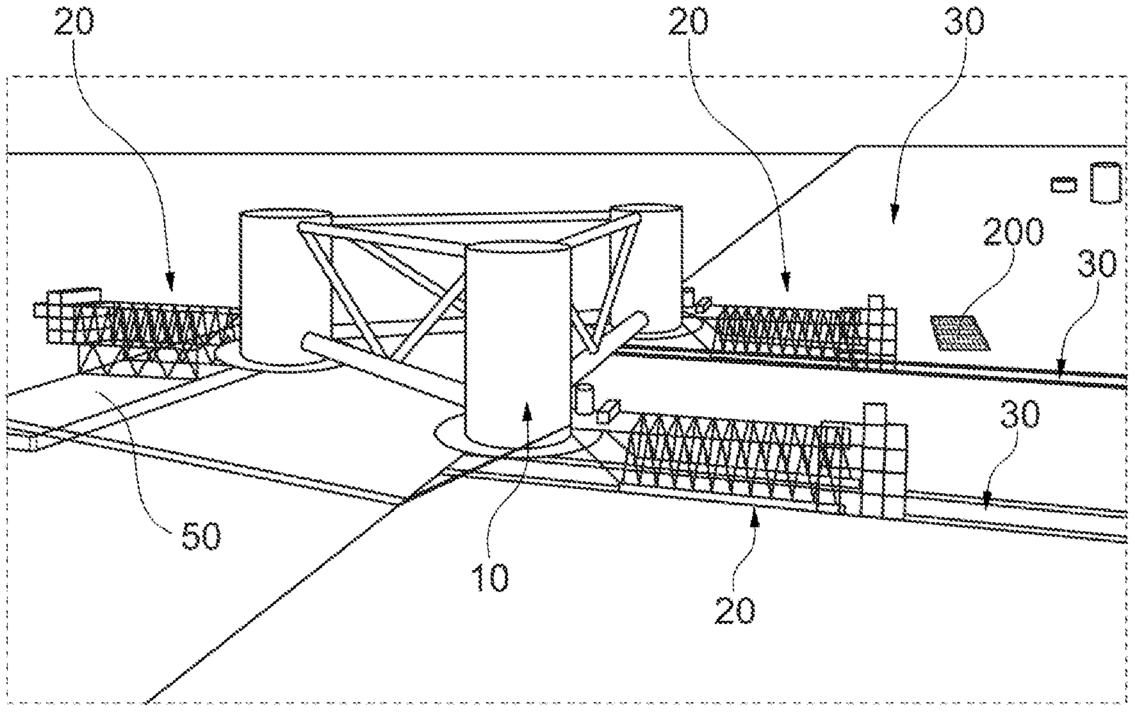
FIG. 38 is a view similar to FIG. 37 showing the load in the course of displacement toward its final position.
Figure 39:
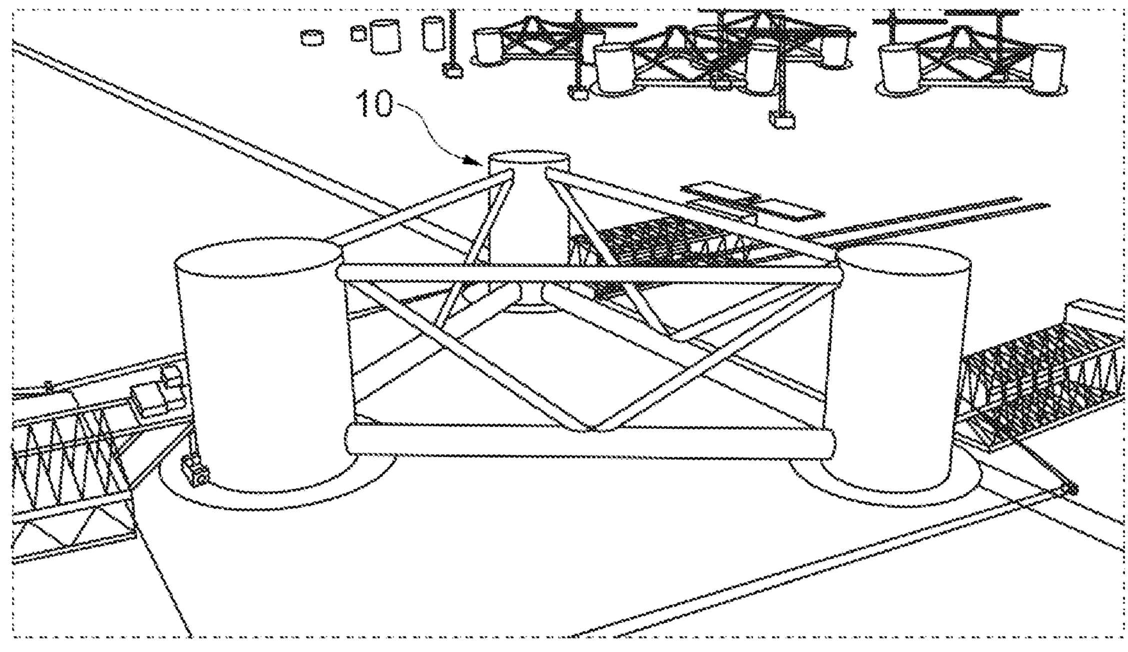
FIG. 39 shows the load after it has reached the final position above the sea.

After removal of the wheel transporters 200; the support structures 20 can be moved toward the water as shown in FIGS. 37-39.

Figure 40:
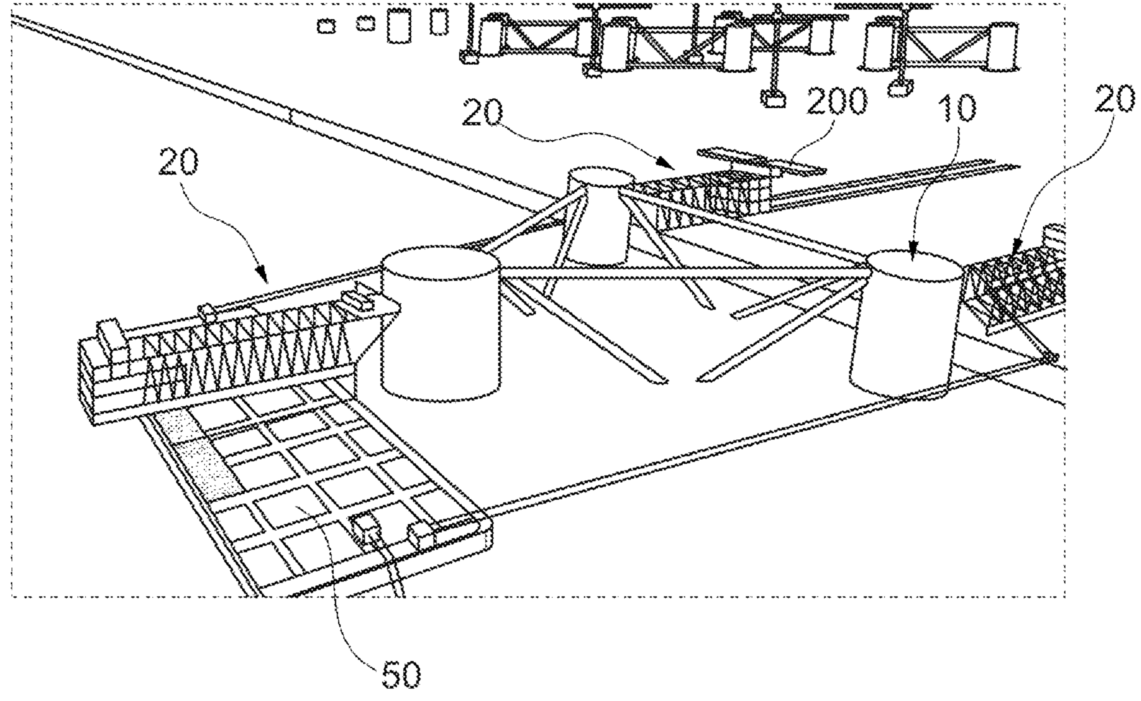
FIG. 40 shows the load partially immerged.

Once the load 10 is fully over the water, it can be immerged as shown in FIG. 40, and then disconnected from the lifting means 60.

Figure 41:
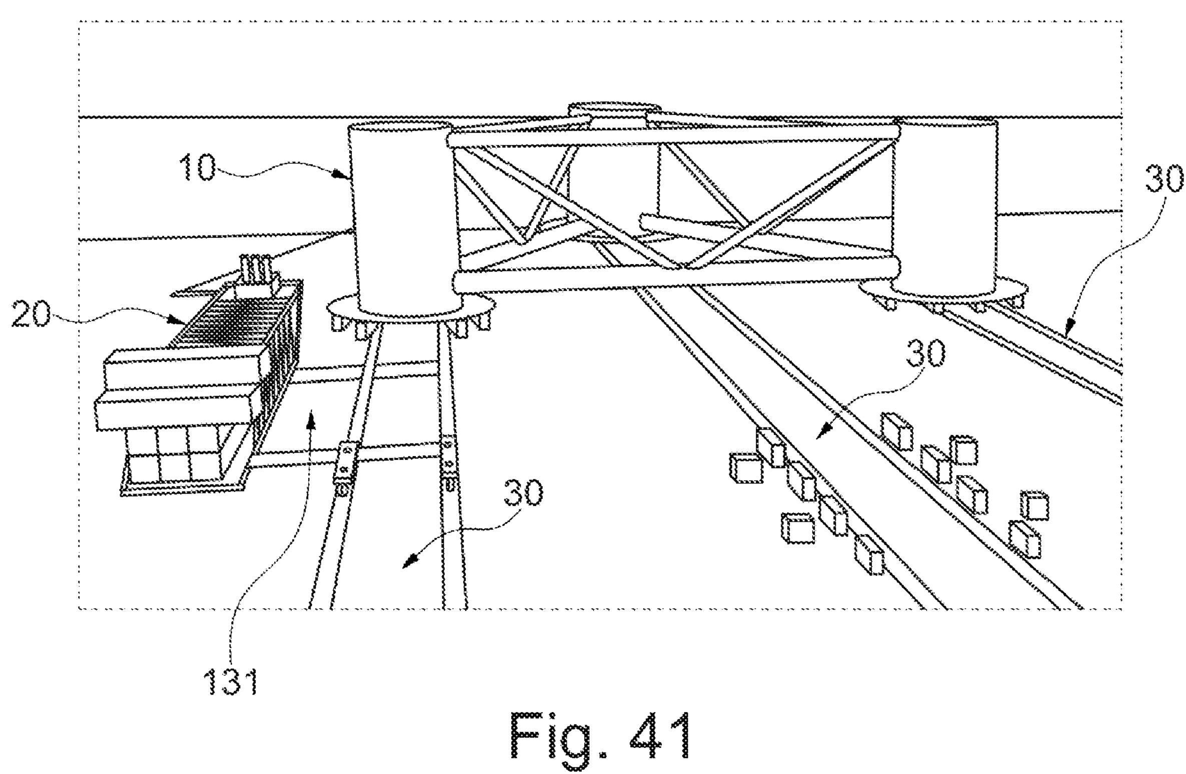
FIG. 41 shows an installation according to a variant embodiment, FIG. 42 illustrate the displacement of some support structures in order to connect lifting means to the load.

FIG. 41 illustrates the possibility for the support structures 20 running on rails of the embodiment of FIGS. 1-11 to move on secondary movement paths 131 to enable the placement of the support structures 20 behind the load 10.

Figure 42:
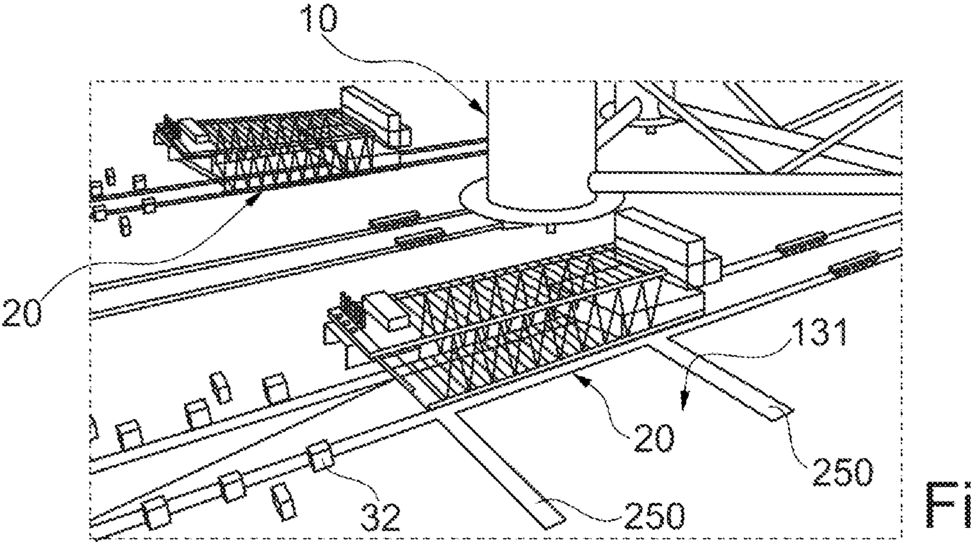

Each secondary movement path may comprise a pair of rails 250 as shown in FIG. 42, that extend perpendicularly to the rails of the movement paths 30.

Figures 43, 44:
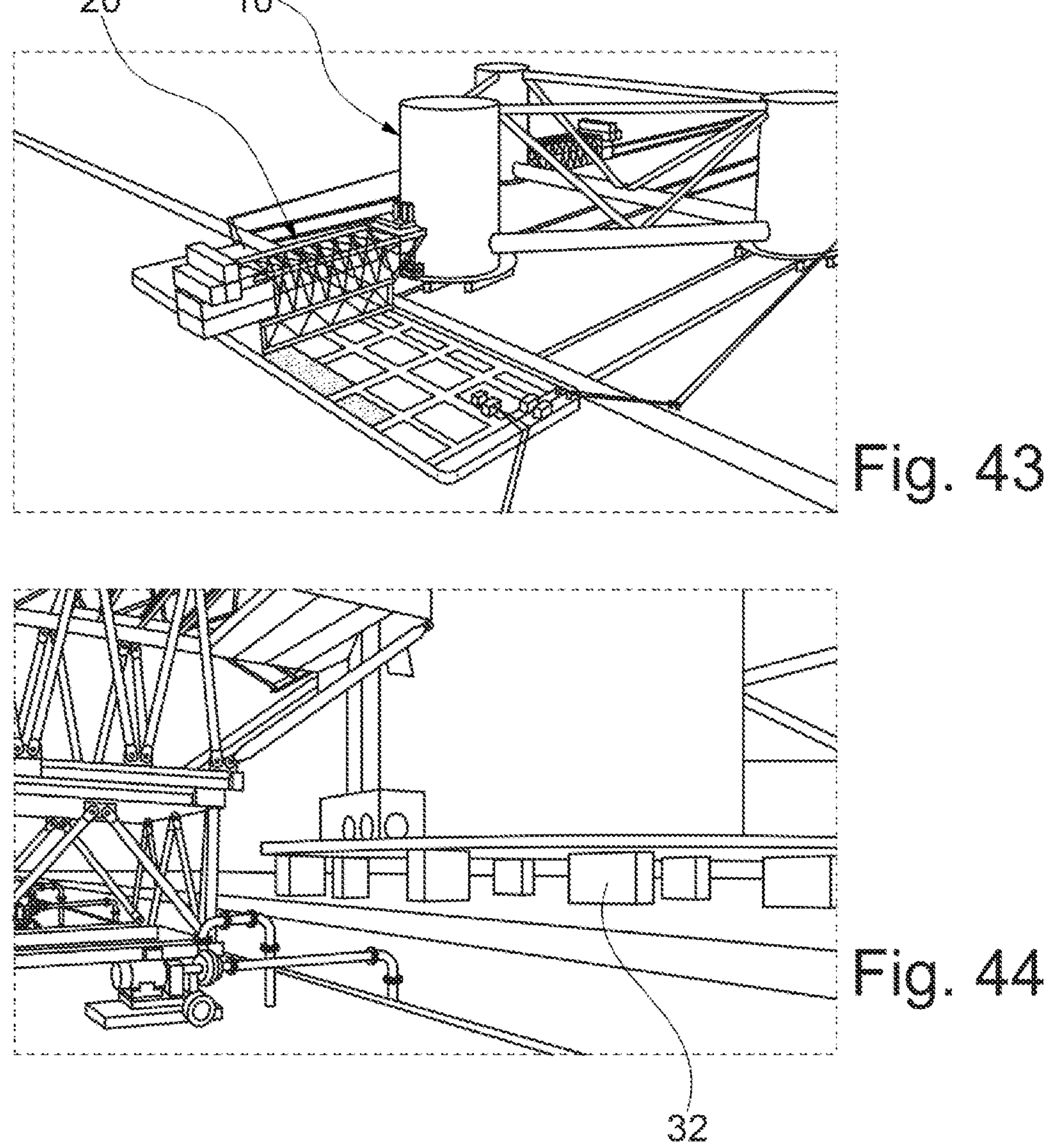
FIG. 43 shows the load after connection to the lifting means of the support structure carried by the barge.
FIG. 44 shows the load resting on support pads.

FIG. 43 illustrates the possibility to connect the mooring lines of the barge 50 to the support structures 20 running onshore.

FIG. 44 shows the load 10 resting on support pads 32 before lifting.

Figure 45:
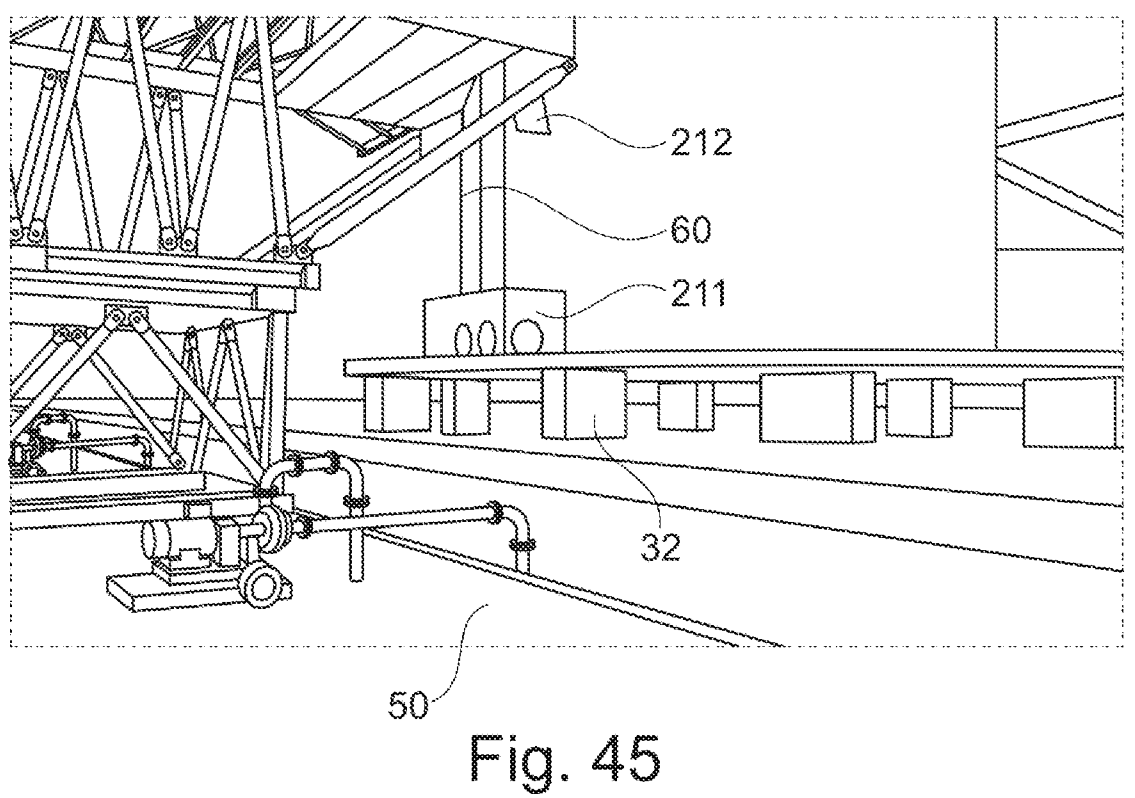
FIG. 45 illustrates a variation of the sea level due to the tide.

FIG. 45 shows the load 10 after lifting.

Figure 46:
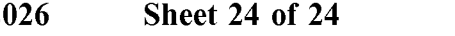
FIG. 46 shows a variant with support structures comprising rotatable cranes.
Figure 46:
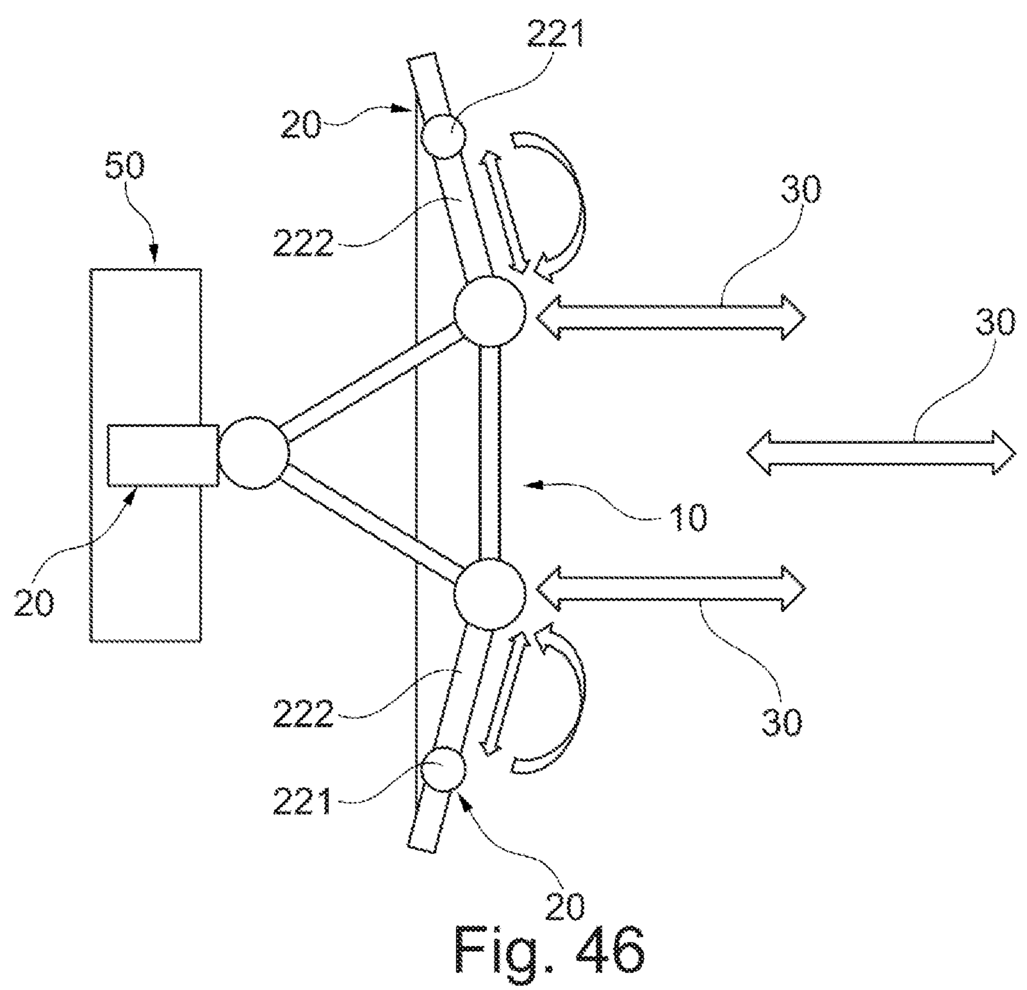

FIG. 46 shows a variant embodiment in which the load 10 is transported onshore by wheel transporters such as SPMTs to an area of the dock next to the sea, between two onshore support structures 20 each having a rotatable crane 222 carried by a mast 221.

The load is connected at a third point to a support structure 20 resting on a barge 50.

For transportation of the load from onshore to offshore, the barge 50 is moved away from the dock and the cranes 222 are rotated. The rotation of the crane may be accompanied by a translation thereof as shown by the arrows on FIG. 46.

The invention claimed is:

1. An installation for the load-out into water of a heavy load located onshore said installation comprising:

at least two support structures that are independent of one another, each of which being equipped with lifting means configured to be hooked to the load, each of these support structures being equipped with a counterweight, wherein the installation is configured to allow the lifting means of the support structures, when the load is positioned in a load-out area, to extend at least partially above the water in order to lower the load into said lifting means and said installation further having at least one offshore support structure borne by a barge, provided with the lifting means configured to be attached to the load.

2. The installation according to claim 1, the barge being movable so as to accompany the movement of the load toward a load-out position.

3. The installation according to claim 2, the barge having an adjustable ballast or a counterweight system making it possible to keep the support structure located above horizontal.

4. The installation according to claim 2, the barge being connected to the dock or support structures by mooring lines which are arranged so as to be gradually unspooled as the load moves away from the dock.

5. The installation according to claim 1, having a submersible barge on which part of the load can rest when the load is in the load-out area.

6. The installation according to claim 5, the installation comprising movement paths extending from an onshore area for receiving the load to an area for the load out of the load, the submersible barge being positioned in the continuation of one of the movement paths of the dock, and having an extension to this path making it possible to move the load onto the barge.

7. The installation according to claim 1, the installation comprising movement paths extending from an onshore area for receiving the load to an area for the load out of the load, the support structures being oriented parallel to the movement paths.

8. The installation according to claim 1, the installation comprising movement paths extending from an onshore area for receiving the load to an area for the load out of the load, the installation having at least three support structures each of which being equipped with lifting means and a counterweight, the movement paths being arranged such that, in the load-out area, all the lifting means of the support structures are located at least partially above the water in order to lower the load into it.

9. The installation according to claim 8, the support structures being oriented transversely with respect to the movement paths.

10. The installation according to claim 8, having two platforms or other structure on piles along which extend the movement paths, the load-out area extending between these platforms or other structure.

11. The installation according to claim 8, the support structures being movable along their longitudinal axis relative to the movement paths, so as to enable them to be moved away from the load once it has been loaded out.

12. The installation according to claim 1, the support structures extending horizontally overall.

13. The installation according to claim 1, the installation comprising movement paths extending from an onshore area for receiving the load to an area for the load out of the load, the movement paths having rails.

14. The installation according to claim 1, the support structures having shoes made of synthetic material that are able to bear against the load.

15. The installation according to claim 1, the installation comprising movement paths extending from an onshore area for receiving the load to an area for the load out of the load, the movement paths being at least three.

16. The installation according to claim 1, the installation comprising movement paths extending from an onshore area for receiving the load to an area for the load out of the load, the movement paths being all parallel to each other or having different directions or being parallel for part thereof and having different directions for other parts.

17. The installation according to claim 1, the installation comprising movement paths extending from an onshore area for receiving the load to an area for the load out of the load, the movement paths being all defined by rails or at least partially defined by rails.

18. The installation according to claim 1, the installation comprising movement paths extending from an onshore area for receiving the load to an area for the load out of the load, at least some part of the movement paths or some movement paths being defined by a concrete surface or by tracks or routes on which wheel transporters such as SPMTs can run.

19. The installation according to claim 1, comprising three movement paths that extend generally parallel to each other and that are defined by rails, the movement paths extending to an end of the dock next to the water, the load being a tripod having feet each carried by a transporter running on a corresponding movement path, before connection of the load with the lifting means of the support structures, one of the support structures being carried by a barge, and the other two being connected to the load once the latter has advanced past a predefined area, the installation comprising additional movement paths enabling each of the two support structures to move from a first place where it is distant from a movement path on which the load runs to a second place where it lies on this movement path behind the load, the additional movement paths being defined by rails, that are perpendicular to the rails of the movement paths on which the load runs.

20. The installation according to claim 1, comprising movement paths on which the support structures run, these movement paths being defined by rails on which the support structures run, the orientation of the support structures being transverse to these movement paths, there being two support structures running on one movement path and one on the other movement path, the installation comprising two piers on which the movement paths extend, the load being hoisted down to the water between the piers by one support structure lying on one pier and the two others on the other pier, the load being a tripod having two feet that run along a same movement path and an opposite foot that runs of the other movement path.

21. The installation according to claim 1; comprising two movement paths that run parallel to each other, generally perpendicular to the dock, and at least one extra movement path that run generally perpendicularly to the other two, the first two movement paths being equipped with rails, the at least one extra path being a concrete surface on which wheel transporters such as SPMTs can run, from a first place where the assembling of the load has been completed to a second place where the load can be hoisted by the support structures for the load out into the water, the installation comprising a barge carrying a third support structure.

22. The installation according to claim 1, at least one support structure comprising a rotatable crane that can rotate during transportation of the load from onshore to offshore.

23. The installation according to claim 1, wherein at least one support structure comprising a rotatable crane that can rotate during transportation of the load from onshore to offshore, and further comprising at least one support structure that has a rotatable crane that can rotate during transportation of the load from onshore to offshore, and a barge carrying another support structure.

24. The installation according to claim 1, at least one support structure comprising at least one first blocking element configured to interfere with at least one second blocking element carried by the load to limit lateral displacement of the load relative to the support structure once the load has been lifted to a top position by the lifting means.

25. A method for the load out into the water of a heavy load using an installation according to claim 1, in which:

the lifting means are acted upon to lower the load into the water, the load being held while it is lowered at least at three points, at least two of which are connected to lifting means of the support structures located onshore, and the third is connected to one from among a submersible barge, a support structure borne by a barge, and a support structure located onshore.

26. The method of claim 25, comprising the use of wheel transporters such as SPMTs to transport the load from an assembly area to the zone where it can be connected to the lifting means of the support structures.

27. The method of claim 25, said third point being connected to a support structure present on a barge, the method comprising acting on a ballast of the barge to compensate for a variation of the force exerted by the load on the lifting means of the support structure present on the barge.

28. The method of claim 25, the load being moved using the support structures located onshore as far as the load-out area.

* * * * *